(12) United States Patent
Iwata et al.

(10) Patent No.: US 9,636,703 B2
(45) Date of Patent: May 2, 2017

(54) METHOD FOR FORMING COATING FILM AND COATED ARTICLE

(75) Inventors: Naoyuki Iwata, Hiratsuka (JP); Fumio Yamashita, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 14/342,579

(22) PCT Filed: Sep. 12, 2012

(86) PCT No.: PCT/JP2012/073349
§ 371 (c)(1),
(2), (4) Date: Mar. 4, 2014

(87) PCT Pub. No.: WO2013/047209
PCT Pub. Date: Apr. 4, 2013

(65) Prior Publication Data
US 2014/0227534 A1    Aug. 14, 2014

(30) Foreign Application Priority Data
Sep. 30, 2011 (JP) ................... 2011-216585

(51) Int. Cl.
*B05D 1/36* (2006.01)
*B05D 3/02* (2006.01)
*C09D 175/04* (2006.01)
*B05D 7/00* (2006.01)
*C08G 18/62* (2006.01)
*C08G 18/78* (2006.01)
*C08G 18/79* (2006.01)
*C08G 18/20* (2006.01)
*C08G 18/22* (2006.01)
*C08G 18/24* (2006.01)
*C08G 18/26* (2006.01)
*C08F 220/14* (2006.01)
*C08F 220/18* (2006.01)
*C08F 220/20* (2006.01)
*C08F 230/02* (2006.01)
*B05D 5/08* (2006.01)
*B05D 7/06* (2006.01)
*B05D 1/04* (2006.01)

(52) U.S. Cl.
CPC .............. *B05D 1/36* (2013.01); *B05D 3/0254* (2013.01); *B05D 5/08* (2013.01); *B05D 7/06* (2013.01); *B05D 7/53* (2013.01); *B05D 7/532* (2013.01); *C08F 220/14* (2013.01); *C08F 220/18* (2013.01); *C08F 220/20* (2013.01); *C08F 230/02* (2013.01); *C08G 18/2063* (2013.01); *C08G 18/222* (2013.01); *C08G 18/227* (2013.01); *C08G 18/244* (2013.01); *C08G 18/26* (2013.01); *C08G 18/6254* (2013.01); *C08G 18/6291* (2013.01); *C08G 18/7831* (2013.01); *C08G 18/7837* (2013.01); *C08G 18/792* (2013.01); *C09D 175/04* (2013.01); *B05D 1/04* (2013.01); *Y10T 428/31551* (2015.04)

(58) Field of Classification Search
CPC .... C08F 220/06; C08F 220/14; C08F 220/18; C08F 220/20; C08F 212/08; C08F 230/02; C08F 222/385; C08F 2220/06; C08F 2220/18; C08F 2220/1808; C08F 2220/1825; C08F 2220/1858; C08F 2220/1891; C08F 2220/325; C08G 18/2063; C08G 18/222; C08G 18/227; C08G 18/244; C08G 18/26; C08G 18/6254; C08G 18/6291; C08G 18/7831; C08G 18/7837; C08G 18/792; C09D 175/04; Y10T 428/31551
USPC ..................................... 428/423.1; 427/385.5
See application file for complete search history.

(56) References Cited

U.S. PATENT DOCUMENTS

| 4,759,961 A | 7/1988 | Kato et al. |
| 2006/0036007 A1 | 2/2006 | Hsieh et al. |

(Continued)

FOREIGN PATENT DOCUMENTS

| CN | 101260272 | 9/2008 |
| EP | 1 958 982 | 8/2008 |

(Continued)

OTHER PUBLICATIONS

International Search Report issued Dec. 18, 2012 in International (PCT) Application No. PCT/JP2012/073349.

(Continued)

*Primary Examiner* — Thao T Tran
(74) *Attorney, Agent, or Firm* — Wenderoth, Lind & Ponack, L.L.P.

(57) ABSTRACT

An object of the present invention is to provide a method for forming a multilayer coating film, the method making it possible to obtain, with excellent curability at low temperatures and in a short period of time, a multilayer coating film exhibiting an excellent finished appearance. The present invention provides a method for forming a multilayer coating film, wherein a substrate is sequentially coated with at least one layer of one or more base coating compositions, and with one or more clear coating compositions, the method being characterized by utilizing a clear coating composition containing a hydroxy-containing acrylic resin (A) having a hydroxy value in a specific range; a polyisocyanate compound (B) having a viscosity in a specific range; and an organometallic catalyst (C) containing a metallic compound (C1) in which the metal is a member selected from the group consisting of zinc, tin, zirconium, bismuth, lead, cobalt, manganese, titanium, aluminum, and molybdenum, and an amidine compound (C2).

12 Claims, No Drawings

(56) References Cited

U.S. PATENT DOCUMENTS

| | | |
|---|---|---|
| 2006/0247341 A1 | 11/2006 | Hsieh et al. |
| 2008/0220275 A1 | 9/2008 | Noguchi et al. |
| 2009/0274846 A1* | 11/2009 | Wada et al. ............... 427/407.1 |
| 2011/0052822 A1 | 3/2011 | Chiga et al. |
| 2012/0282834 A1 | 11/2012 | Palm et al. |
| 2014/0308451 A1 | 10/2014 | Westhoff et al. |
| 2014/0322448 A1 | 10/2014 | Hoffmann et al. |

FOREIGN PATENT DOCUMENTS

| | | |
|---|---|---|
| GB | 2 456 696 | 7/2009 |
| GB | 2473102 | 3/2011 |
| JP | 61-209070 | 9/1986 |
| JP | 9-125000 | 5/1997 |
| JP | 2002-97412 | 4/2002 |
| JP | 2004-314060 | 11/2004 |
| JP | 2005-225907 | 8/2005 |
| JP | 2010-58068 | 3/2010 |
| WO | 2011/083109 | 7/2011 |
| WO | 2012/123166 | 9/2012 |
| WO | 2012/123198 | 9/2012 |

OTHER PUBLICATIONS

Extended European Search Report issued Jun. 29, 2015 in corresponding European Application No. 12837032.7.

* cited by examiner

METHOD FOR FORMING COATING FILM AND COATED ARTICLE

TECHNICAL FIELD

Cross Reference of Related Application

This application claims priority to Japanese Patent Application No. 2011-216585, filed on Sep. 30, 2011, the entire contents of which are incorporated by reference herein.

The present invention relates to a method for forming a multilayer coating film. The method can provide a multilayer coating film that can be cured at low temperatures in a short period of time, and that has an excellent finished appearance.

BACKGROUND ART

From the standpoint of energy saving and reduction of environmental burdens, research toward the development of a shortened bake curing step and reduced operation steps has been actively conducted in the field of automotive body coating and industrial product coating.

For example, after electrodeposition coating, intercoating and top coating are typically provided in sequence, and baking has conventionally been performed following each of the intercoating and top coating. However, in an effort to reduce the operation steps in automotive body coating, there has been progress in research aimed at shortening the baking step by performing a single baking step for both the intercoating and top coating after the top coating is provided. This coating method comprising a shortened baking step is becoming the mainstream method.

With respect to shortening the bake curing step, there exists an increasing demand for lowering temperatures and shortening the time required for performing the step.

In the method for forming a multilayer coating film that meets the demand for low-temperature, short-time curing, hydroxyl/isocyanate-crosslinked coating compositions have been considered to be a strong candidate as a coating composition in view of cost efficiency. Hydroxyl/isocyanate-crosslinked coating compositions are obtained by crosslinking hydroxy-containing resins using a polyisocyanate compound as a crosslinking agent and curing the crosslinked resins. Thus, such compositions have been researched so far.

However, the prior art has been unsatisfactory in shortening the curing time in an attempt to improve the curability at low temperatures in a short period of time, and it has also been difficult to satisfy the requirement for an excellent appearance in automobile body coating and other kinds of coating.

Patent Literature 1 discloses a coating composition comprising as essential components a pyrazole-blocked polyisocyanate compound that contains per molecule two or more tertiary isocyanate groups blocked by a pyrazole compound, and a hydroxy-containing resin having a specific hydroxyl value and a specific weight average molecular weight. Patent Literature 1 also discloses a method for forming a coating film using the coating composition. However, the method for forming a coating film using such a coating composition has been unsatisfactory in curability under short-time curing conditions.

Patent Literature 2 discloses a curable coating composition comprising a resin composition for preparing a coating composition and a (blocked) polyisocyanate compound, wherein the resin composition comprises a polyol (A1), a polyether polyol (B), and a solvent (C), wherein the polyol (A1) has a ring structure. Patent Literature 2 further discloses another curable coating composition comprising an organometallic compound and an acidic substance in addition to the aforementioned curable coating composition.

This coating composition is excellent in curability at low temperatures in a short period of time in an embodiment where the coating composition comprises an organometallic compound and an acidic substance; however, the pot life is unsatisfactory. The finished appearance of a multilayer coating film obtained through the method for forming a coating film using such a coating composition is also sometimes unsatisfactory.

Patent Literature 3 discloses a method for forming on a rigid resin part a coating film excellent in finished appearance, coating film performance, coating composition stability, and the like, through baking at low temperatures in a short period of time. The method comprises the steps of applying a colored base coating composition and subsequently a clear coating composition to a rigid resin part, followed by curing of both coating films, characterized in that the clear coating composition contains in a specific ratio: an acrylic resin obtained by copolymerizing a monomer mixture having a specific composition; and a curing agent.

However, the method for forming a coating film is sometimes unsatisfactory in curability under short-time curing conditions, and the resulting multilayer coating film can also be poor in finished appearance.

CITATION LIST

Patent Literature

PTL 1: JP2005-225907A
PTL 2: JP2002-097412A
PTL 3: JP2004-314060A

SUMMARY OF INVENTION

Technical Problem

An object of the present invention is to provide a method for forming a multilayer coating film that has excellent curability at low temperatures and in a short period of time, and that exhibits an excellent finished appearance.

Solution to Problem

The present inventors conducted extensive research to solve the above problem. As a result, they found that the above object can be achieved by a method for forming a multilayer coating film, wherein at least one layer of a base coating composition and a clear coating composition are subsequently applied to a substrate. The method uses a clear coating composition that contains a hydroxy-containing acrylic resin having a hydroxy value in a specific range, a polyisocyanate compound having a viscosity in a specific range, and an organometallic catalyst containing a metallic compound, selected from a specific range, and an amidine compound.

More specifically, the present invention provides the following Items:

Item 1. A method for forming a multilayer coating film comprising:

applying one or more base coating compositions (Y) in at least one layer to a substrate to form a base coating film in at least one layer;

applying one or more clear coating compositions (Z) to the above uncured base coating film formed in at least one layer; and simultaneously curing the at least one layer of uncured base coating film and the above uncured clear coating film, wherein the clear coating composition (Z) comprises:

a hydroxy-containing acrylic resin (A) having a hydroxy value in the range of 85 to 215 mg KOH/g, a polyisocyanate compound (B) having a viscosity at 25° C. in the range of 200 to 4,000 mPa·s, and an organometallic catalyst (C) containing a metallic compound (C1) in which the metal is a member selected from the group consisting of zinc, tin, zirconium, bismuth, lead, cobalt, manganese, titanium, aluminum and molybdenum, and an amidine compound (C2), wherein the equivalent ratio (NCO/OH) of isocyanate groups in the polyisocyanate compound (B) to hydroxy groups in the hydroxy-containing acrylic resin (A) is in the range of 0.8 to 1.8.

Item 2. The method for forming a multilayer coating film according to Item 1, wherein the content of secondary hydroxy-containing polymerizable unsaturated monomer (a1) relative to the total mass of hydroxy-containing polymerizable unsaturated monomer (a) in the hydroxy-containing acrylic resin (A) is 50 to 100% by mass.

Item 3. The method for forming a multilayer coating film according to Item 1 or 2, wherein the hydroxy-containing acrylic resin (A) comprises, as at least one other polymerizable unsaturated monomer (b), a $C_{6-20}$ alicyclic hydrocarbon-containing polymerizable unsaturated monomer (b1).

Item 4. The method for forming a multilayer coating film according to any one of Items 1 to 3, wherein the hydroxy-containing acrylic resin (A) has a weight average molecular weight in the range of 2,000 to 50,000.

Item 5. The method for forming a multilayer coating film according to any one of Items 1 to 4, wherein the metallic compound (C1) is a carboxylic acid metal salt compound.

Item 6. The method for forming a multilayer coating film according to any one of Items 1 to 5, wherein the content of the organometallic catalyst (C) is in the range of 0.05 to 5% by mass relative to the total mass of the hydroxy-containing acrylic resin (A) and the polyisocyanate compound (B).

Item 7. An article containing a multilayer coating film formed by any one of the methods for forming a multilayer coating film according to Items 1 to 6.

Advantageous Effects of Invention

In the method for forming a multilayer coating film of the present invention, the clear coating composition comprises an organometallic catalyst that contains a metallic compound selected from a specific range and an amidine compound as a catalyst for a crosslinking reaction between a hydroxy-containing resin and a polyisocyanate compound, achieving excellent curability at low temperatures and in a short period of time, and, at the same time, attaining a satisfactory pot life.

This is presumably because the organometallic catalyst has a complex structure in which an amidine compound is coordinated to a metal compound, and the amidine compound causes steric effects. Therefore, while the organometallic catalyst has a structure in which an amidine compound is coordinated, the catalytic activity for urethanization reaction that metallic compounds (metallic ions) inherently possess can be suppressed, thus also achieving an excellent pot life.

Furthermore, the amidine compound dissociates at a relatively low temperature. Therefore, when it reaches this relatively low dissociation temperature, the coordinated amidine compound is eliminated, allowing the metallic compound to be reproduced. Here, due to the catalytic activity for urethanization reaction that metallic compounds (metallic ions) inherently possess, a coating composition having excellent curability at low temperatures and in a short period of time is presumably obtained.

Furthermore, since polyisocyanate compounds have a specific, comparatively low viscosity range, the resulting clear coating composition has excellent flowability, which presumably allows a cured coating film having an excellent finished appearance to be obtained.

Also, since the polyisocyanate compounds have a specific, comparatively low viscosity range, they can permeate into a base coating layer located therebelow, and function as a cross linking agent to improve the curability of the base coating layer. This makes it possible to improve the curability of the multilayer coating film as a whole at low temperatures and in a short period of time.

As described above, the method for forming a coating film of the present invention achieves an effect that makes it possible to obtain, with excellent curability at low temperatures and in a short period of time, a multilayer coating film exhibiting an excellent finished appearance.

DESCRIPTION OF EMBODIMENTS

Hereunder, the method for forming a multilayer coating film of the present invention (which may be referred to as the method of the present invention) is explained in detail.

The method for forming a multilayer coating film of the present invention is such that a substrate is sequentially coated with one or more base coating compositions, and with one or more clear coating compositions. The method uses a clear coating composition that contains a hydroxy-containing acrylic resin having a hydroxy value in a specific range, a polyisocyanate compound having a viscosity in a specific range, and an organometallic catalyst containing a metallic compound selected from a specific range and an amidine compound.

Substrate

The substrate to which the method of the present invention can be applied is not particularly limited. Specific examples thereof include metal substrates such as cold rolled steel plates, galvanized steel plates, zinc alloy-plated steel plates, stainless steel plates, tinned steel plates, and like steel plates, aluminum plates, and aluminum alloy plates; various plastic substrates; and the like. The substrate may also be the body or a part of various vehicles, such as automobiles, motorcycles, containers and the like formed from the materials mentioned above.

Usable substrates also include metal substrates and vehicle bodies whose metal surface has been subjected to a surface treatment such as phosphate treatment, chromate treatment, composite oxide treatment, or the like. Usable substrates further include such metal substrates, vehicle bodies, and the like having an undercoating film and/or an intermediate coating film of various electrodeposition coating compositions formed thereon, and a plastic member such as a bumper, onto which a primer coating film has been formed.

In the method for forming a multilayer coating film of the present invention, a base coating composition (Y) is first coated.

In the method of the present invention, the base coating composition (Y) indicates a coating composition for achieving aesthetic features, including color and luster, and is distinguished from the intermediate coating composition (X) described below.

Base Coating Composition (Y)

The base coating composition (Y) used in the method for forming a multilayer coating film of the present invention can be prepared, generally, by mixing and dispersing a base resin, cross linking agent, and pigment or the like in a solvent. In light of current trends to reduce the solvent volume as an environmental consideration, an aqueous base coating composition (Y1) may be preferably used as the base coating composition (Y).

As the base resin, for example, the use of a carboxy- and hydroxy-containing resin is preferable. Examples of the base resin include acrylic resin, polyester resin, polyether resin, polycarbonate resin, and polyurethane resin.

When an aqueous base coating composition (Y1) is used, it is preferable that the carboxy groups contained in the carboxy- and hydroxy-containing resin be neutralized. The neutralization is preferably performed using a basic compound before mixing with a cross linking agent.

Examples of the basic compound usable for neutralization include ammonia; primary monoamines such as ethylamine, propylamine, butylamine, benzylamine, monoethanolamine, neopentanolamine, 2-aminopropanol, and 3-aminopropanol; secondary monoamines such as diethylamine, diethanolamine, di-n- or di-iso-propanolamine, N-methylethanolamine, and N-ethylethanolamine; tertiary monoamines such as N,N-dimethylethanolamine, trimethylamine, triethylamine, triisopropylamine, and methyldiethanolamine; polyamines such as diethylenetriamine, hydroxyethylaminoethylamine, ethylaminoethylamine, and methylaminopropylamine; etc. These basic compounds may be used singly, or in a combination of two or more.

In the neutralization, the basic compound is preferably used in an amount generally 0.1 to 1.5, and particularly 0.3 to 1.2 equivalent relative to the carboxy group contained in the carboxy- and hydroxy-containing resin.

The base resin preferably has, in light of water dispersibility, an acid value in the range of generally 10 to 150 mg KOH/g, and particularly in the range of 30 to 100 mg KOH/g. In light of curability, the base resin has a hydroxy value generally in the range of 10 to 150 mg KOH/g, and particularly in the range of 30 to 100 mg KOH/g.

Furthermore, in view of weather resistance and the like, when the base resin is an acrylic resin, it preferably has a number average molecular weight in the range of generally 3,000 to 100,000, and particularly 5,000 to 50,000. When the base resin is polyester resin, it preferably has a number average molecular weight in the range of generally 500 to 50,000, and in particular 3,000 to 30,000.

When a carboxy- and hydroxy-containing acrylic resin is used as the base resin, it is also possible to use a carboxy- and hydroxy-containing acrylic resin that is produced by emulsion polymerization in the presence of a dispersion stabilizer.

In the case where an acrylic resin produced by the emulsion polymerization described above is used, it preferably has a number average molecular weight generally in the range of 100,000 or more, in particular in the range of 200,000 to 2,000,000.

Examples of the dispersion stabilizer preferably usable for emulsion polymerization include, as well as nonionic surfactants and anionic surfactants, aqueous resins such as acrylic resin having an acid value of about 10 to 150 mg KOH/g and a number average molecular weight in the range of about 5,000 to 30,000.

The emulsion polymerization can be performed by a known method.

Among these, as the base resin, in order to provide an aqueous base coating composition (Y1) having excellent coating operability, the use of an acrylic emulsion obtained by multistage polymerization using a carboxy-containing unsaturated monomer as the copolymerization component is preferable. More specifically, an acrylic emulsion obtained by the following polymerization reaction is preferable. That is, a polymerization reaction is first performed using a monomer mixture having a composition that contains no or a very small amount of a carboxy-containing unsaturated monomer (generally, 3% by mass or less relative to the total amount of monomers), followed by a polymerization reaction using a monomer mixture containing a carboxy-containing unsaturated monomer (generally, 5 to 30% by mass relative to the total amount of monomers). The resulting acrylic emulsion exhibits a viscosity developing effect due to the neutralization using a basic compound, thus obtaining an aqueous base coating composition (Y1) having excellent coating operability, such as an anti-sagging property.

As the cross linking agent, at least one cross linking agent that can react with hydroxy groups is selected from melamine resins, blocked polyisocyanate compounds, and water-dispersible blocked polyisocyanate compounds.

The proportion of the base resin and cross linking agent in the base coating composition (Y) relative to the total solids content of the base resin and cross linking agent are generally in the range of 60 to 100% by mass, preferably in the range of 65 to 95% by mass, and more preferably in the range of 70 to 90% by mass for the base resin, and generally in the range of 0 to 40% by mass, preferably in the range of 5 to 35% by mass, and more preferably in the range of 10 to 30% by mass for the cross linking agent.

The pigment is not particularly limited and, for example, inorganic and organic color pigments, extender pigments and effect pigments are suitably used. Examples of color pigments include titanium oxide, zinc oxide, carbon black, cadmium red, molybdenum red, chrome yellow, chromium oxide, Prussian blue, cobalt blue, azo pigments, phthalocyanine pigments, quinacridone pigments, isoindoline pigments, threne pigments, and perylene pigments. Specific examples of the extender pigments include talc, clay, kaolin, baryta, barium sulfate, barium carbonate, calcium carbonate, silica, and alumina white. Specific examples of the effect pigments include aluminum powder, mica powder, and titanium oxide-coated mica powder.

The proportion of the pigment is preferably, relative to the total solids content of the base resin and cross linking agent, in the range of generally 0.1 to 200% by mass, and preferably 1 to 100% by mass.

The base coating composition (Y) may further contain, if necessary, a curing catalyst, a dispersant, an antisettling agent, a defoaming agent, a thickener, a UV absorber, a light stabilizer, a surface control agent, an antioxidant, and the like.

The preferable nonvolatile content of the base coating composition (Y) at the time of application is generally 15 to 65% by mass. A single layer thereof may be an opaque or transparent solid tone or metallic tone coating film. In the present specification, an opaque coating film means a coating film whose light transmittance for a 20-μm cured coating film of an aqueous base coating composition alone is less than 5%, and a transparent coating film means a coating film whose light transmittance for a 20-μm cured coating film is 5% or greater.

The base coating composition (Y) is adjusted to have a suitable coating viscosity. For example, in the case of the aqueous base coating composition (Y1), when measured with a B-type viscometer at 20° C. and rotation of 60 rpm, the base coating composition has a viscosity of generally 200 to 800 cps (centipoise), and preferably 400 to 600 cps. Coating can be performed by air spray coating, airless spray coating, or rotary atomization coating, optionally conducting an electrostatic charge, in such a manner that the film thickness based on the cured coating film becomes generally 5 to 30 μm, and in particular, 10 to 25 μm.

In the method of the present invention, the base coating composition (Y) is applied to the substrate, and subsequently a clear coating composition (Z) is applied thereto. Prior to the application of the clear coating composition (Z), if necessary, at least one layer of the base coating film obtained by applying the base coating composition (Y) may be pre-dried at a temperature of about 50 to 100° C.

This pre-drying process allows the volatile components contained in the at least one layer of base coating film to volatilize to some extent.

The pre-drying process described above dries and solidifies the coating film to some extent, so that when a clear coating composition (Z) is coated onto the at least one layer of base coating film, even if the solvents, the low-molecular resin components, and other components contained in the coating film penetrate and are diffused into the base coating film, reduction in the viscosity of the base coating film can be suppressed, and, when metallic pigments are used, the reflow of metallic pigments or the like can be reduced, preventing the occurrence of metallic unevenness, etc.

At least one layer of the base coating composition (Y) may be applied, and, if necessary, two or more layers may be applied.

When the base coating film is formed with two or more layers, the material for each base coating composition (Y) may be the same or different.

When the base coating film is formed with two or more layers, pre-drying may be performed in each step of forming each base coating film.

The substrate to which the base coating composition (Y) is to be applied may be such that an uncured intermediate coating composition (X) has been coated and an intermediate coating film has been formed thereon.

In the present specification, the intermediate coating composition (X) means a coating composition applied to the layer below the base coating composition (Y), which achieves an aesthetic effect.

Intermediate Coating Composition (X)

In the method for forming a multilayer coating film of the present invention, the formation of an intermediate coating film is not essential; however, when such a film is formed, a known intermediate coating composition can be used. The coating composition may be either an aqueous coating composition or an organic solvent-based coating composition. The term "aqueous coating composition" in this specification is used in contrast to "organic solvent-based coating composition," and generally means a coating composition in which a binder, a pigment, etc., are dispersed and/or dissolved in water, or in a medium comprising water as a main component (aqueous medium).

An intermediate coating composition (X) can be prepared generally by dissolving or mixing and dispersing a base resin, a cross linking agent, a pigment, etc., in a medium.

Examples of base resins include resins containing cross-linkable functional groups, such as a carboxy group and a hydroxy group. Examples of the resin include acrylic resin, polyester resin, polyether resin, polycarbonate resin, polyurethane resin, and epoxy resin. These base resins may be used singly or in a combination of two or more.

As the cross linking agent, a compound having a functional group that can react with a hydroxy group is preferably used. Preferable examples thereof include polyisocyanate compounds that may be blocked, melamine resin, and urea resin. These cross linking agents may be used singly or in a combination of two or more.

The pigment is not particularly limited. Examples of the preferably used pigment include color pigments of inorganic and organic pigments, extender pigments and effect pigments.

These pigments may be used singly or in a combination of two or more.

The intermediate coating composition (X) may further contain, if necessary, various additives such as a curing catalyst, a dispersant, an antisettling agent, a defoaming agent, a rheology control agent (thickener, anti-sagging agent), an antisettling agent, a UV absorber, a light stabilizer, a surface control agent, an antioxidant, and other additives generally used in coating compositions.

When the intermediate coating composition (X) is an aqueous coating composition, if a carboxy-containing resin is used as at least part of the base resin, the carboxy group in the base resin is preferably neutralized. The neutralization is preferably performed using a basic compound.

Examples of the basic compound usable for neutralization include the basic compounds mentioned previously for the aqueous base coating composition (Y1), and these basic compounds may be used singly or in a combination of two or more.

The amount of the basic compound used for neutralization is preferably in the range of 0.1 to 1 equivalent, and, in particular, 0.2 to 0.8 equivalent relative to the carboxy group in the resin.

In the intermediate coating composition (X), the compounding ratio of the base resin and the cross linking agent is not particularly limited. Preferably, the base resin is in the range of 40 to 90% and, in particular, 50 to 80%, and the cross linking agent is in the range of 60 to 10% and, in particular, 50 to 20% relative to the total solids content of the total of the two components.

Using a diluent solvent, etc., the coating viscosity of the intermediate coating composition (X) may be adjusted to the range of 13 to 60 seconds, and preferably 15 to 40 seconds, at 20° C. measured with Ford cup No. 4. Thereafter, the intermediate coating composition (X) may be coated using an air spray, an airless spray, a rotary atomization coating device, etc., and an electrostatic charge may be applied, if necessary. Coating is performed to give a film thickness of generally 5 to 25 μm, and, in particular, 10 to 20 μm based on the cured coating film.

After forming an intermediate coating film by applying the intermediate coating composition (X), the base coating composition (Y) is coated onto the uncured intermediate coating film. After forming the uncured intermediate coating film, pre-heating may be suitably performed prior to applying the base coating composition (Y). The temperature of the pre-heating process is preferably 40 to 100° C., and more preferably 50 to 90° C. The pre-heating time is preferably 30 seconds to 15 minutes, and more preferably 1 to 10 minutes.

On top of the at least one layer of base coating film formed by the base coating composition (Y), a clear coating composition (Z) is coated.

Clear Coating Composition (Z)

The clear coating composition (Z) used in the method for forming a multilayer coating film of the present invention is a clear coating composition comprising a hydroxy-containing acrylic resin (A), a polyisocyanate compound (B), and an organometallic catalyst (C) containing a metallic compound (C1) and an amidine compound (C2).

Hydroxy-Containing Acrylic Resin (A)

The hydroxy-containing acrylic resin (A) can be prepared by copolymerizing monomer components comprising a hydroxy-containing polymerizable unsaturated monomer (a) and at least one other polymerizable unsaturated monomer (b) by an ordinary method.

The hydroxy-containing polymerizable unsaturated monomer (a) is a compound having one carboxy group and one polymerizable unsaturated bond per molecule.

Examples of the hydroxy-containing polymerizable unsaturated monomer (a) include secondary hydroxy-containing polymerizable unsaturated monomers (a1) and hydroxy-containing (excluding secondary hydroxy groups) polymerizable unsaturated monomers (a2).

Examples of the secondary hydroxy-containing polymerizable unsaturated monomer (a1) include polymerizable unsaturated monomers having a secondary hydroxy group whose alkyl group in the ester moiety has 2 to 8, in particular 3 to 6, and still more particularly 3 or 4 carbon atoms, such as 2-hydroxypropyl (meth)acrylate, 2-hydroxybutyl (meth) acrylate, and 3-hydroxybutyl (meth)acrylate; and adducts of (meth)acrylic acid with an epoxy-containing compound, e.g., "Cardura E10" (tradename, produced by Hexion Specialty Chemicals; a decanoic acid glycidyl ester). Among these, 2-hydroxypropyl (meth)acrylate is particularly preferable.

The monomers (a1) may be used singly or in a combination of two or more.

The hydroxy-containing (excluding secondary hydroxy groups) polymerizable unsaturated monomer (a2) is a compound having one hydroxy group (excluding secondary hydroxy groups) and one polymerizable unsaturated bond per molecule.

Examples of the monomer include monoesterified products (excluding those containing a secondary hydroxy group) of (meth)acrylic acid with a dihydric alcohol containing 2 to 10 carbon atoms, such as 2-hydroxyethyl (meth)acrylate, 3-hydroxypropyl (meth)acrylate, and 4-hydroxybutyl (meth)acrylate; modified hydroxy-containing monomers (excluding those containing a secondary hydroxy group) obtained by subjecting an 2-caprolactone to a ring-opening polymerization reaction.

Examples of the modified hydroxy-containing monomer obtained by subjecting an ε-caprolactone to a ring-opening polymerization reaction include commercially available products, such as "Placcel FA-1," "Placcel FA-2," "Placcel FA-3," "Placcel FA-4," "Placcel FA-5," "Placcel FM-1," "Placcel FM-2," "Placcel FM-3," "Placcel FM-4," and "Placcel FM-5" (trade names, all manufactured by Daicel Chemical Industries Co., Ltd.), and the like.

The monomers (a2) may be used singly or in a combination of two or more.

In this specification, "(meth)acrylate" means "acrylate or methacrylate," and "(meth)acrylic acid" means "acrylic acid or methacrylic acid." Additionally, "(meth)acryloyl" means "acryloyl or methacryloyl."

The at least one other polymerizable unsaturated monomer (b) is a monomer other than the hydroxy-containing polymerizable unsaturated monomer (a). Examples thereof include compounds having one polymerizable unsaturated bond per molecule. Specific examples of the unsaturated monomer (b) are listed in (1) to (7) below.

(1) Acid group-containing polymerizable unsaturated monomer

The acid group-containing polymerizable unsaturated monomer is a compound having one acid group and one polymerizable unsaturated bond per molecule. Specific examples of the monomer include carboxyl-containing monomers, such as (meth)acrylic acid, crotonic acid, itaconic acid, maleic acid, and maleic anhydride; sulfonic acid-containing monomers, such as vinyl sulfonic acid and sulfoethyl (meth)acrylate; and acidic phosphate monomers, such as 2-(meth)acryloyloxyethyl acid phosphate, 2-(meth) acryloyloxypropyl acid phosphate, 2-(meth)acryloyloxy-3-chloropropyl acid phosphate, and 2-methacryloyloxyethylphenyl phosphoric acid. These monomers may be used singly or in a combination of two or more. When an acid group-containing polymerizable unsaturated monomer is used, the acrylic resin (A) preferably has an acid value of about 0.5 to 30 mg KOH/g, and an acid value of about 1 to 20 mg KOH/g is particularly preferable.

(2) Esterified products of acrylic acid or methacrylic acid with a monohydric alcohol having 1 to 20 carbon atoms; for example, methyl(meth)acrylate, ethyl(meth)acrylate, propyl (meth)acrylate, butyl acrylate, n-butyl(meth)acrylate, isobutyl(meth)acrylate, tert-butyl(meth)acrylate, 2-ethylhexyl (meth)acrylate, isooctyl(meth)acrylate, isomyristyl(meth) acrylate, stearyl(meth)acrylate, "Isostearyl Acrylate" (trade name, produced by Osaka Organic Chemical Industry, Ltd.), lauryl(meth)acrylate, tridecyl(meth)acrylate, stearyl(meth) acrylate, tetrahydrofurfuryl(meth)acrylate, cyclohexyl (meth)acrylate, isobornyl(meth)acrylate.

When an esterified product of acrylic acid or methacrylic acid with a monohydric alcohol having 1 to 20 carbon atoms is included as a constituent component, the proportion of the product preferably ranges from 10 to 60% by mass, and more preferably 15 to 50% by mass, based on the total amount of the monomer components.

Of the esterified products of acrylic acid or methacrylic acid with a monohydric alcohol having 1 to 20 carbon atoms, a $C_{6-20}$ alicyclic hydrocarbon-containing polymerizable unsaturated monomer (b1) can be used to improve both finished appearance and coating film curability.

Typical examples of the $C_{6-20}$ alicyclic hydrocarbon group include cyclohexyl, cyclooctyl, cyclododecyl, isobornyl, adamanthyl, tricyclo decanyl, and the like.

Examples of the unsaturated monomer (b1) include cycloalkyl(meth)acrylates, such as cyclohexyl(meth)acrylate, 4-methylcyclohexylmethyl(meth)acrylate, 4-ethylcyclohexylmethyl (meth)acrylate, 4-methoxy cyclohexylmethyl(meth)acrylate, tert-butylcyclohexyl(meth)acrylate, cyclooctyl(meth)acrylate, and cyclododecyl(meth)acrylate; polymerizable unsaturated monomers having a bridged alicyclic hydrocarbon group, such as isobornyl(meth)acrylate, tricyclodecanyl(meth)acrylate, adamantyl(meth)acrylate, 3,5-dimethyl adamantyl(meth)acrylate, and 3-tetracyclo dodecyl (meth)acrylate; etc.

When an unsaturated monomer (b1) is used, the proportion of the monomer preferably ranges from 10 to 60% by mass, more preferably 15 to 50% by mass, and even more preferably to 45% by mass based on the total amount of the monomer components.

(3) Alkoxysilyl group-containing polymerizable unsaturated monomers: for example, vinyltrimethoxysilane, vinyltriethoxysilane, acryloxyethyl trimethoxysilane, methacryloxyethyl trimethoxysilane, acryloxypropyl trimethoxysilane, methacryloxypropyl trimethoxysilane, acryloxypropyl triethoxysilane, methacryloxypropyl triethoxysilane, vinyltris(β-methoxyethoxy)silane, and the like. Preferable examples of alkoxysilyl group-containing polymerizable unsaturated monomers include vinyltrimethoxysilane, γ-acryloxyprophyl trimethoxysilane, γ-methacryloxpropyl trimethoxysilane, and the like.

When an alkoxysilane group-containing polymerizable unsaturated monomer is used as a constituent component, crosslinkages may be formed, in addition to the crosslinkages of hydroxy groups and isocyanate groups, by a condensation reaction of alkoxysilane groups and a reaction of alkoxysilane groups and hydroxy groups. Thereby, the curability can be improved.

When the alkoxysilane group-containing polymerizable unsaturated monomer is included as a constituent component, the proportion of the monomer preferably ranges from 1 to 20% by mass, and more preferably 1 to 10% by mass, based on the total amount of the monomer components.

(4) Aromatic-based vinyl monomers: for example, styrene, α-methylstyrene, vinyltoluene, and the like.

When an aromatic-based polymerizable unsaturated monomer is included as a constituent component, the glass transition temperature of the resulting resin is raised and a hydrophobic coating film with a high refractive index can be obtained. This achieves an excellent finished appearance by improving the gloss of the coating film.

When an aromatic-based polymerizable unsaturated monomer is included as a constituent component, the proportion thereof preferably ranges from 3 to 40% by mass, and more preferably 5 to 30% by mass, based on the total amount of the monomer components.

(5) Glycidyl group-containing polymerizable unsaturated monomers: for example, compounds having one glycidyl group and one polymerizable unsaturated bond per molecule, such as glycidyl acrylate, glycidyl methacrylate, and the like.

(6) Compounds containing nitrogen and polymerizable unsaturated bond: for example, acrylamide, methacrylamide, dimethylacrylamide, N,N-dimethylpropylacrylamide, N-butoxymethylacrylamide, N-methylolacrylamide, N-methylolmethacrylamide, diacetone acrylamide, N,N-dimethylaminoethyl(meth)acrylate, vinylpyridine, vinylimidazol, acrylonitrile, methacrylonitrile, and the like.

(7) Other vinyl compounds: for example, vinyl acetate, vinyl propionate, vinyl chloride, vinyl versatates, and the like. Examples of vinyl versatates include commercially available products "VEOVA 9" and "VEOVA 10," produced by Japan Epoxy Resin Co., Ltd., and the like.

As at least one other polymerizable unsaturated monomer (b), those listed in (1) to (7) above may be used singly or in a combination of two or more. The combinations of monomers listed in (1), (2), and (4) are preferable.

The weight average molecular weight of the acrylic resin (A) is preferably about 2,000 to 50,000, and more preferably about 5,000 to 30,000 to attain an excellent finished appearance and curability of the coating film.

The weight average molecular weight as used herein refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns, "TSK GEL G-4000HXL," "TSK GEL G-3000HXL," "TSK GEL G-2500HXL," and "TSK GEL G-2000HXL" (trade names; produced by Tosoh Corporation), under the following conditions: mobile phase: tetrahydrofuran, measuring temperature: 40° C., flow rate: 1 cc/min, and detector: RI.

The glass transition temperature of the acrylic resin (A) is preferably about −10 to 30° C., and more preferably about −5 to 20° C. to attain an excellent finished appearance and curability of the coating film.

In the present specification, the glass transition temperature (° C.) of the acrylic resin is calculated using the following formulae:

$$1/Tg\ (K) = (W1/T1) + (W2/T2) + \ldots \quad (i)$$

$$Tg(° C.) = Tg\ (K) - 273 \quad (ii)$$

In each formula, W1, W2, . . . represent the mass fractions of the monomers used for copolymerization, and T1, T2, . . . represent the Tg (K) of the homopolymers of each of the monomers.

To improve the finished appearance and pot life of the coating film, the secondary hydroxy-containing polymerizable unsaturated monomer (a1) is preferably contained in an amount of 50 to 100% by mass, and more preferably 80 to 100% by mass based on the total amount of the hydroxy-containing polymerizable unsaturated monomer (a) in the acrylic resin (A).

The hydroxy value of the acrylic resin (A) is 85 to 215 mg KOH/g, preferably 100 to 200 mg KOH/g, and more preferably 120 to 200 mg KOH/g to attain an excellent curability and finished appearance.

To attain an excellent curability and finished appearance in the cured coating film, the proportion of each of the hydroxy-containing polymerizable unsaturated monomer (a) and other polymerizable unsaturated monomer (b) is such that the hydroxy-containing polymerizable unsaturated monomer (a) is preferably contained in an amount of about 20 to 50% by mass, and more preferably about 30 to 45% by mass, and that the other polymerizable unsaturated monomer (b) is preferably contained in an amount of about 50 to 80% by mass, and more preferably about 55 to 70% by mass based on the total monomer content.

The acid value of the acrylic resin (A) is preferably about 0.5 to 30 mg KOH/g, and more preferably about 1 to 20 mg KOH/g to attain excellent curability of the coating composition.

The hydroxy-containing acrylic resin (A) can be obtained by copolymerizing a monomer mixture of the polymerizable unsaturated monomers (a) and (b).

The method for copolymerizing the monomer mixture to obtain a hydroxy-containing acrylic resin (A) is not particularly limited, and known copolymerization methods can be used. Of these, a solution polymerization method, in which polymerization is conducted in an organic solvent in the presence of a polymerization initiator, is preferably used.

Examples of the organic solvent used in the solution polymerization method include toluene, xylene, Swasol 1000 (trade name, produced by Cosmo Oil Co., Ltd., an oil-based high-boiling-point solvent), and like aromatic-based solvents; ethyl acetate, butyl acetate, 3-methoxybutyl acetate, ethylene glycol ethyl ether acetate, propylene glycol methyl ether acetate, and like ester-based solvents; methyl ethyl ketone, methyl isobutyl ketone, methyl amyl ketone, and like ketone-based solvents; propyl propionate, butyl propionate, ethoxyethyl propionate; and the like.

These organic solvents may be used singly, or in a combination of two or more. However, considering the solubility of the acrylic resin, high-boiling-point ester-based solvents or high-boiling-point ketone-based solvents are preferably used. A high-boiling-point aromatic-based solvent may be suitably used in combination.

Examples of the polymerization initiator used for copolymerizing the hydroxy-containing acrylic resin (A) include known radical polymerization initiators, such as 2,2'-azobisisobutyronitrile, benzoyl peroxide, di-t-butyl peroxide, di-t-amyl peroxide, t-butyl peroctoate, 2,2'-azobis (2-methylbutyronitrile), and the like.

The hydroxy-containing acrylic resins (A) can be used singly or in a combination of two or more.

In the clear coating composition (Z) used in the method of the present invention, resins other than the hydroxy-containing acrylic resin (A) can be used in combination as necessary. Therefore, the clear coating composition (Z) may include resins other than the hydroxy-containing acrylic resin (A). Specific examples thereof include acrylic resins other than the acrylic resin (A), polyester resins, polyether resins, polyurethane resins, and the like. Preferable examples include hydroxy-containing polyester resins and hydroxy-containing polyurethane resins.

The hydroxy-containing polyester resin may be produced by a known method, for example, by an esterification reaction of a polybasic acid and polyhydric alcohol. The polybasic acid is a compound having at least two carboxyl groups per molecule, and examples thereof include phthalic acid, isophthalic acid, terephthalic acid, succinic acid, adipic acid, azelaic acid, sebacic acid, tetrahydrophthalic acid, hexahydrophthalic acid, maleic acid, fumaric acid, itaconic acid, trimellitic acid, pyromellitic acid, and anhydrides thereof. The polyhydric alcohol is a compound having at least two hydroxy groups per molecule, and examples thereof include diols, such as ethylene glycol, propylene glycol, 1,3-propanediol, 1,4-butanediol, 1,5-pentanediol, 1,6-hexanediol, 2,2-diethyl-1,3-propanediol, neopentyl glycol, 1,9-nonanediol, 1,4-cyclohexanediol, hydroxypivalic acid neopentyl glycol ester, 2-butyl-2-ethyl-1,3-propanediol, 3-methyl-1,5-pentanediol, 2,2,4-trimethyl pentanediol, hydrogenation bisphenol A, and the like; trihydric or higher polyol components, such as trimethylolpropane, trimethylolethane, glycerin, pentaerythritol, and the like; and hydroxycarboxylic acids, such as 2,2-dimethylolpropionic acid, 2,2-dimethylolbutanoic acid, 2,2-dimethylolpentanoic acid, 2,2-dimethylolhexanoic acid, 2,2-dimethyloloctanoic acid, and the like.

Alternatively, a monoepoxy compound, such as propylene oxide, butylene oxide or a like α-olefin epoxide, or "Cardura E10" (trade name, produced by Japan Epoxy Resin Co., Ltd.; a synthetic highly branched saturated fatty acid glycidyl ester) may be reacted with an acid, and the resulting compound may be introduced into the polyester resin.

Carboxyl groups can be introduced into the polyester resin by, for example, adding an acid anhydride to a hydroxy-containing polyester for half-esterification.

The hydroxy-containing polyester resin preferably has a hydroxy value ranging from 85 to 250 mg KOH/g, and more preferably 100 to 220 mg KOH/g. The hydroxy-containing polyester resin preferably has a weight average molecular weight ranging from 2,500 to 40,000 and more preferably from 5,000 to 30,000.

Examples of hydroxy-containing polyurethane resins include hydroxy-containing polyurethane resins that are obtainable by a reaction of a polyol and a polyisocyanate.

Examples of polyols include low molecular weight polyols, such as ethylene glycol, diethylene glycol, propylene glycol, butylene glycol, hexamethylene glycol and like dihydric alcohols; trimethylolpropane, glycerol, pentaerythritol and like trihydric alcohols; and higher molecular weight polyols, such as polyether polyols, polyester polyols, acrylic polyols, epoxy polyols, and the like. Examples of polyether polyols include polyethylene glycol, polypropylene glycol, polytetramethylene glycol, and the like. Examples of polyester polyols include polycondensates of the dihydric alcohols described above, dipropylene glycol, 1,4-butanediol, 1,6-hexanediol, neopentyl glycol or like alcohols with a dibasic acid, such as adipic acid, azelaic acid, sebacic acid, or the like; polyols obtained by ring-opening polymerization of a lactone, such as polycaprolactone; polycarbonate diols; and the like. Further, for example, carboxy-containing polyols, such as 2,2-dimethylolpropionic acid, 2,2-dimethlolbutanoic acid, and the like, may also be utilized.

Examples of polyisocyanates to be reacted with such polyols include aliphatic polyisocyanate compounds, such as hexamethylene diisocyanate, trimethylhexamethylene diisocyanate, dimer acid diisocyanate, lysine diisocyanate, and the like; biuret adducts and isocyanurate ring adducts of such polyisocyanates; alicyclic diisocyanate compounds, such as isophorone diisocyanate, 4,4'-methylenebis(cyclohexylisocyanate), methylcyclohexane-2,4-(or -2,6-)diisocyanate, 1,3-(or 1,4-) di(isocyanatomethyl)cyclohexane, 1,4-cyclohexane diisocyanate, 1,3-cyclopentane diisocyanate, 1,2-cyclohexane diisocyanate, and the like; biuret adducts and isocyanurate ring adducts of such polyisocyanates; aromatic diisocyanate compounds, such as xylylene diisocyanate, metaxylylene diisocyanate, tetramethylxylylene diisocyanate, tolylene diisocyanate, 4,4'-diphenylmethane diisocyanate, 1,5-naphthalene diisocyanate, 1,4-naphthalene diisocyanate, 4,4'-toluidine diisocyanate, 4,4'-diphenylether diisocyanate, m-(or p-)phenylene diisocyanate, 4,4'-biphenylene diisocyanate, 3,3'-dimethyl-4,4'-biphenylene diisocyanate, bis(4-isocyanatophenyl)sulfone, isopropylidene bis(4-phenylisocyanate), and the like; biuret adducts and isocyanuric ring adducts of such polyisocyanates; polyisocyanate compounds having at least three isocyanate groups per molecule, such as triphenylmethane-4,4',4"-triisocyanate, 1,3,5-triisocyanatobenzene, 2,4,6-triisocyanatotoluene, 4,4'-dimethyldiphenylmethane-2,2',5,5'-tetraisocyanate, and the like; biuret adducts and isocyanurate ring adducts of such polyisocyanates; and the like.

The hydroxy-containing polyurethane resin preferably has a hydroxy value ranging from 85 to 250 mg KOH/g, and more preferably 100 to 220 mg KOH/g. The hydroxy-containing polyurethane resin preferably has a weight average molecular weight ranging from 2,500 to 40,000 and more preferably from 5,000 to 30,000. The hydroxy-containing polyurethane resin preferably has a glass transition temperature ranging from −40° C. to 85° C. and more preferably from −30° C. to 80° C.

When a resin other than the above hydroxy-containing acrylic resin (A) (specifically, polyester resin, polyether resin, polyurethane resin, and the like.) is used in combination, the resin other than the hydroxy-containing acrylic resin (A) is preferably contained in an amount of 100% by mass or less, and more preferably 10 to 50% by mass based on the total solids content of the hydroxy-containing acrylic resin (A).

Polyisocyanate Compound (B)

The polyisocyanate compound (B) is a curing agent of the clear coating composition (Z), and has at least two isocyanate groups per molecule. Polyisocyanate compounds that have been generally employed in the production of polyurethane can be utilized. Examples of the polyisocyanate compound (B) include aliphatic polyisocyanates, alicyclic polyisocyanates, aliphatic-aromatic polyisocyanates, aromatic polyisocyantates, derivatives of these polyisocyanates, and the like.

Examples of aliphatic polyisocyanates include trimethylene diisocyanate, tetramethylene-1,4-diisocyanate, pentamethylene-1,5-diisocyanate, hexamethylene diisocyanate, 1,2-propylene diisocyanate, 1,2-butylene diisocyanate, 2,3-butylene diisocyanate, 1,3-butylene diisocyanate, 2,2,4-trimethylhexamethylene-1,6-diisocyanate, 2,6-diisocyanatomethylcaproate, lysine diisocyanate, and like aliphatic diisocyanates; lysine ester triisocyanates, 1,4,8-triisocyanato octane, 1,6,11-triisocyanato undecane, 1,8-diisocyanato-4-isocyanato methyloctane, 1,3,6-triisocyanato hexane, 2,5,7-trimethyl-1,8-diisocyanate-5-isocyanato methyloctane, and like aliphatic triisocyanates; and the like.

Examples of alicyclic polyisocyanates include 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexylisocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or a mixture thereof, norbornane diisocyanate and like alicyclic diisocyanates; 1,3,5-triisocyanato cyclohexane, 1,3,5-trimethylisocyanato cyclohexane, 2-(3-isocyanatopropyl)-2,5-di(isocyanatomethyl)-bicyclo[2.2.1]heptane, 2-(3-isocyanatopropyl)-2,6-di(isocyanatomethyl)-bicyclo[2.2.1] heptane, 3-(3-isocyanatopropyl)-2,5-di(isocyanatomethyl)-bicyclo[2.2.1]heptane, 5-(2-isocyanatoethyl)-2-isocyantomethyl-3-(3-isocyanatopropyl)-bicyclo[2.2.1] heptane, 6-(2-isocyanatoethyl)-2-isocyanatomethyl-3-(3-isocyanatopropyl)-bicyclo[2.2.1]heptane, 5-(2-isocyanatoethyl)-2-isocyanatomethyl-2-(3-isocyanatopropyl)-bicyclo[2.2.1]heptane, 6-(2-isocyanatoethyl)-2-isocyanatomethyl-2-(3-isocyanatopropyl)-bicyclo[2.2.1]heptane and like alicyclic triisocyanates; and the like.

Examples of aliphatic-aromatic polyisocyanates include 1,3- or 1,4-xylylene diisocyanate or a mixture thereof, ω,ω'-diisocyanato-1,4-diethylbenzene, 1,3- or 1,4-bis(1-isocyanato-1-methylethyl)benzene (common name: tetramethylxylylene diisocyanate) or a mixture thereof, and like aliphatic-aromatic diisocyanates; and 1,3,5-triisocyanate methylbenzene and like aliphatic-aromatic triisocyanates; and the like.

Examples of aromatic polyisocyanates include m-phenylene diisocyanate, p-phenylene diisocyanate, 4,4'-diphenyl diisocyanate, 1,5-naphthalene diisocyanate, 2,4'- or 4,4'-diphenylmethane diisocyanate, or a mixture thereof, 2,4- or 2,6-tolylene diisocyanate, or a mixture thereof, 4,4'-toluidine diisocyanate, 4,4'-diphenylether diisocyanate and like aromatic diisocyanates, for example, triphenylmethane-4,4', 4"-triisocyanate, 1,3,5-triisocyanato benzene, 2,4,6-triisocyanato toluene and like aromatic triisocyanates, for example, 4,4'-diphenylmethane-2,2',5,5'-tetraisocyanate and like aromatic tetraisocyanates; and the like.

Examples of polyisocyanate derivatives include dimers, trimers, biurets, allophanates, carbodiimides, urethodiones, urethoimines, isocyanurates, oxadiazine triones, polymethylene polyphenyl polyisocyanates (crude MDI, polymeric MDI), crude TDI, and the like, of the aforementioned polyisocyanate compounds.

Of these, hexamethylene diisocyanate (hereinbelow sometimes referred to as HMDI), isophorone diisocyanate (hereinbelow sometimes referred to as IPDI), and derivatives thereof are particularly preferably used because they are industrially readily available.

These polyisocyanate compounds may be used singly, or in a combination of two or more.

The viscosity of the polyisocyanate compound (B) at 25° C. is 200 to 4,000 mPa·s, preferably 250 to 3,000 mPa·s, and more preferably 300 to 2,000 mPa·s. The curability of the clear coating film, and even more the curability of the multilayer coating film, may be reduced when the viscosity is less than 200 mPa·s. In contrast, when the viscosity exceeds 4,000 mPa·s, the finished appearance of the obtained multilayer coating film may be reduced.

As the polyisocyanate compound (B), those containing a dimer or higher multimer disocyanate compound can be preferably used to attain an excellent finished appearance and curability at a low temperature for a short period of time.

When the polyisocyanate compound (B) contains a dimer or higher multimer as mentioned above, a compound containing an isocyanurate trimer preferably in an amount of 30 to 70% by mass, more preferably 40 to 70% by mass, and even more preferably 50 to 70% by mass; a urethodione dimer preferably in an amount of 3 to 30% by mass, more preferably 5 to 25% by mass, and even more preferably 8 to 20% by mass; and other trimers or higher multimers preferably in an amount of 0 to 67% by mass, more preferably 5 to 55% by mass, and even more preferably 10 to 42% by mass, based on the total content of the polyisocyanate compound, can be preferably used.

The isocyanurate trimer is a polyisocyanate having an isocyanurate group comprising three diisocyanate monomers, and the urethodione dimer is a polyisocyanate having a urethodione group comprising two diisocyanate monomers.

It is preferable that a polyisocyanate compound does not contain an unreacted diisocyanate monomer. The concentration of the remaining diisocyanate monomer is preferably 1% by mass or less, and more preferably 0.5% by mass or less.

Organometallic Catalyst (C)

The organometallic catalyst (C) comprises a metallic compound (C1) and an amidine compound (C2).

The combined use of a metallic compound (C1) and an amidine compound (C2) contributes to excellent curability at low temperatures and in a short time period and to the excellent finished appearance of the formed coating film, and makes it possible to sufficiently maintain the pot life as a two-liquid-type coating composition.

The reason for this is considered to be as follows. The catalyst comprising a metallic compound (C1) and an amidine compound (C2) forms a complex structure, and the amidine compound serves as a blocking agent. The amidine compound as a blocking agent is dissociated at a low temperature. After dissociation of the amidine compound, the catalytic performance with excellent low-temperature curability inherent in the metallic compound is activated. The clear coating composition (Z) can thereby achieve both satisfactory pot life and curability at low temperatures and in a short time period.

The metallic compound (C1) contains metal that is a member selected from the group consisting of zinc, tin, zirconium, bismuth, lead, cobalt, manganese, titanium, aluminum, and molybdenum. Examples of the metallic compound include carboxylic acid metal salt compounds, acetylacetone metal complexes, and the like. In particular, carboxylic acid metal salt compounds can be preferably used.

Specific examples of carboxylic acid metal salt compounds include compounds represented by the following formula (1):

$$(RCO_2)_nM \quad (1)$$

wherein M is a metal selected from the group consisting of Zn, Sn, Zr, Bi, Pb, Co, Mn, Ti, Al, and Mo; R is $C_{1-30}$ alkyl, $C_{5-10}$ aryl, or $C_{1-30}$ aralkyl or alkylaryl; n is an integer having a value of 1 or more and 4 or less. In the present invention, $C_{1-30}$ aralkyl or alkylaryl refers to aralkyl or alkylaryl wherein the alkyl moiety has 1 to 30 carbon atoms. Examples of aryl include $C_{5-10}$ aryl.

More specific examples include 2-ethylhexanoic acid (octylic acid) metal salts, acetic acid metal salts, naphthenic acid metal salts, benzoic acid metal salts, octanoic acid metal salts, lauric acid metal salts, stearic acid metal salts, neodecanoic acid metal salts, oleic acid metal salts, and the like.

In one embodiment of the present invention, examples of carboxylic acid metal salt compounds include compounds represented by the following formula (1'):

$$(R(CO_2)_nM \quad (1')$$

wherein M is a metal selected from the group consisting of Zn, Sn, Zr, Bi, Pb, Co, Mn, Ti, Al, and Mo; R' is $C_{1-30}$ alkyl, or $C_{1-30}$ aralkyl or alkylaryl; and n is an integer having a value of 1 or more and 4 or less.

Examples of compounds represented by the formula (1') include 2-ethylhexanoic acid metal salts, acetic acid metal salts, naphthenic acid metal salts, octanoic acid metal salts, stearic acid metal salts, neodecanoic acid metal salts, oleic acid metal salts, and the like.

Preferred in terms of excellent catalytic activity and easy industrial availability are manganese octylate, tin octylate, cobalt octylate, titanium octylate, aluminum octylate, zinc octylate, zirconium octylate, bismuth octylate, lead octylate, zinc laurate, zinc dibenzoate, etc.

The amidine compound (C2) is an organic compound having a structure represented by $R^1$—C(=$NR^2$)—$NR^3R^4$. In this structure, a carbon (C) atom is bonded to one nitrogen atom via a double bond and to one nitrogen atom via a single bond.

In the structural formula (2): $R^1$—C(=$NR^2$)—$NR^3R^4$, $R^1$ is hydrogen, an optionally substituted organic group attached to carbon, or an optionally substituted amine group; specifically, an optionally substituted hydrocarbyl group or an optionally etherified hydroxyl group.

$R^2$ and $R^3$ are each independently hydrogen or an organic group attached to carbon, or are bonded to each other to form a heterocyclic ring (a heterocyclic ring with one or more heteroatoms or a fused bicyclic ring with one or more heteroatoms).

$R^4$ is hydrogen, an optionally substituted organic group attached to carbon, or an optionally substituted and optionally etherified hydroxyl group; preferably an optionally substituted hydrocarbyl group having 8 or more carbon atoms.

When $R^1$ or $R^4$ is an organic group, it may be an organic group having 1 to 40 carbon atoms or a polymer group having a molecular weight of, for example, 500 to 50,000.

The groups represented by $R^1$, $R^2$, $R^3$, and $R^4$ may each independently contain an alcoholic hydroxyl group as a substituent.

Specific examples of amidine compounds represented by the structural formula (2): $R^1$—C(=$NR^2$)—$NR^3R^4$, wherein $R^2$ and $R^3$ are not bonded to each other, include N'-cyclohexyl-N,N-dimethylformamidine, N'-methyl-N,N-di-n-butylacetamidine, N'-octadecyl-N,N-dimethylformamidine, N'-cyclohexyl-N,N-dimethylvaleramidine, 1-methyl-2-cyclohexyliminopyrrolidine, 3-butyl-3,4,5,6-tetrahydropyrimidine, N-(hexyliminomethyl)morpholine, N-(α-(decyliminoethyl)ethyl)pyrrolidine, N'-decyl-N,N-dimethylformamidine, N'-dodecyl-N,N-dimethylformamidine, N'-cyclohexyl-N,N-acetamidine, and the like.

Examples of the amidine compound (C2) also include amidine compounds having a structure in which $R^2$-$R^3$ form a 5- to 7-membered ring containing two nitrogen atoms in the amidine structure, and in which either $R^1$-$R^3$ or $R^1$-$R^4$ form a 5- to 9-membered ring together with one nitrogen atom in the amidine structure and a plurality of carbon atoms.

Specific examples of amidine compounds having such a structure include 1,5-diazabicyclo(4.3.0)non-5-ene, 1,8-diazabicyclo(5.4.0)undec-7-ene, 1,4-diazabicyclo(3.3.0)oct-4-ene, 2-methyl-1,5-diazabicyclo(4.3.0)non-5-ene, 2,7,8-trimethyl-1,5-diazabicyclo(4.3.0)non-5-ene, 2-butyl-1,5-diazabicyclo(4.3.0)non-5-ene, 1,9-diazabicyclo(6.5.0)tridec-8-ene, and the like.

Other examples of the amidine compounds include heterocyclic compounds of the structural formula (2): $R^1$—C(=$NR^2$)—$NR^3R^4$, wherein $R^2$ and $R^3$ are bonded to each other, such as imidazoline, imidazole, tetrahydropyrimidine, dihydropyrimidine, and pyrimidine rings.

An imidazole derivative is generally represented by the following structural formula:

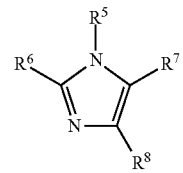

In this formula, $R^5$, $R^6$, $R^7$, and $R^8$ are each independently hydrogen, alkyl, substituted alkyl, hydroxyalkyl, allyl, aralkyl, cycloalkyl, a heterocyclic ring, ether, thioether, halogen, —N(R)$_2$, polyethylene polyamine, nitro, keto, ester, carbonamide, or these functional groups substituted with alkyl.

Specific examples of imidazole compounds include N-(2-hydroxyethyl) imidazole, N-(3-aminopropyl)imidazole, 4-(hydroxymethyl)imidazole, 1-(tert-butoxycarbonyl)imidazole, imidazole-4-propionic acid, 4-carboxyimidazole, 1-butylimidazole, 1-methylimidazole, 2-methyl-4-imidazolecarboxylic acid, 4-formylimidazole, 1-(ethoxycarbonyl) imidazole, reaction product of propylene oxide with imidazole and 2-methylimidazole, (1-trimethylsilyl imidazole, 4-(hydroxymethyl)imidazole hydrochloride, copolymer of 1-chloro-2,3-epoxypropane and imidazole, 1-(p-toluenesulfonyl)imidazole, 1,1-carbonylbisimidazole, 1-(2-cyanoethyl)-2-ethyl-4-methylimidazole, 2-phenyl-2-imidazoline pyromellitate, 4-(hydroxymethyl)imidazole picrate, disodium salt of 2-propenoic acid with 4,5-dihydro-2-nonyl-1H-imidazole-1-ethanol and 2-heptyl-4,5-dihydro-1H-imidazole-1-ethanol disodium salt, 1-(cyanoethyl)-2- undecylimidazole trimellitate, 1-(2-hydroxypropyl) imidazole formate, sodium imidazolate, silver imidazolate, and the like.

These amidine compounds can be used singly or in a combination of two or more.

More specifically, in the clear coating composition (Z), the organometallic catalyst (C) is a metal complex, and the complex can be produced, for example, by heating 1 mol of a carboxylic acid metal salt and 2 mol of an amidine compound in a solvent, such as methanol.

In the above production, the mixture is maintained at about 50° C. for about 2 hours until it becomes a transparent solution, thereby forming a metal complex. The transparent solution is filtered and dried.

The molar ratio of the amidine compound (C2) to the metallic compound (C1) (the ratio of the number of moles of (C1) to the number of moles of (C2)) is preferably in the range of 1.3 to 8.0, more preferably 1.6 to 5.0, and even more preferably 1.8 to 4.0.

When the molar ratio is outside the range of 1.3 to 8.0, either one of the low-temperature short-time curability, pot life, and finished appearance may be insufficient.

From the viewpoint of low-temperature short-time curability, pot life, and finished appearance, the amount of the component (C) is preferably in the range of 0.05 to 5% by mass, more preferably 0.1 to 4% by mass, and even more preferably 0.3 to 3% by mass, relative to the total mass of the components (A) and (B).

When the amount is less than 0.05% by mass, low-temperature short-time curability may be insufficient. In contrast, when the amount is greater than 5% by mass, the finished appearances of the resulting clear coating film and multilayer coating film may not be satisfactory.

The organometallic catalyst (C) may be used after being dissolved in a solvent. Examples of solvents include, but are not limited to, alcohol solvents, such as ethylene glycol, diethylene glycol, dipropylene glycol, propylene glycol, and butanediol; hydrocarbon solvents, such as toluene, xylene, mineral turpentine, and mineral spirit; ester solvents, such as ethyl acetate, butyl acetate, methyl glycol acetate, and cellosolve acetate; ketone solvents, such as methyl ethyl ketone, methyl isobutyl ketone, and cyclohexanone; glycol ether solvents, such as 3-ethoxyethyl propionate and 3-methoxybutyl acetate; organic solvents of amide compounds, such as N,N-dimethylformamide and N,N-dimethylacetamide; β-diketone solvents, such as acetylacetone and its fluorine-substituted derivatives; ketoester solvents, such as methyl acetoacetate and ethyl acetoacetate; and other solvents.

In addition to the organometallic catalyst (C), a catalyst other than the organometallic catalyst (C) can be used in the clear coating composition (Z), if necessary. Accordingly, the clear coating composition (Z) may contain a catalyst other than the organometallic catalyst (C).

Catalysts other than the organometallic catalyst (C) are not particularly limited, as long as they are organic metals that are known as catalysts for polyurethane production. Specific examples thereof include organic tin catalysts, such as stannous diacetate, stannous dioctoate, stannous dioleate, stannous dilaurate, dibutyltin oxide, dibutyltin diacetate, dibutyltin dilaurate, dibutyltin dichloride, and dioctyltin dilaurate.

Among these, stannous dioctoate and dibutyltin dilaurate are preferred.

In the clear coating composition (Z), the equivalent ratio of isocyanate groups in the polyisocyanate compound (B) to hydroxy groups in the hydroxy-containing acrylic resin (A) (NCO/OH) is in the range of 0.8 to 1.8, preferably 0.8 to 1.6, and more preferably 0.8 to 1.5, from the viewpoint of low-temperature short-time curability, the finished appearance of the resulting coating film, and the water resistance, acid resistance, etc., of the cured coating film.

The glass transition temperature (Tg) of the clear coating film formed from the clear coating composition (Z) is preferably in the range of about 80 to 120° C., and more preferably about 90 to 110° C., from the viewpoint of improving the finished appearances of the resulting clear coating film and multilayer coating film.

In the present invention, the glass transition temperature (Tg) of the coating film is a value of the cured coating film determined by dynamic viscoelasticity measurement.

The dynamic viscoelasticity measurement was performed at a temperature increase rate of 3° C./min in a temperature range of 20 to 200° C. at a frequency of 11 Hz. In this measurement, the glass transition temperature (Tg: ° C.) of the coating film is a temperature at which tan δ is the maximum value. The dynamic viscoelasticity measuring device used was an FT Rheospectra DVE-V4 (trade name of a dynamic viscoelasticity measuring device, produced by Rheology Co. Ltd.).

Other Components

The clear coating composition (Z) comprises a hydroxy-containing acrylic resin (A), a polyisocyanate compound (B), and an organometallic catalyst (C) as essential components. The clear coating composition (Z) generally contains an organic solvent, and may further contain, if necessary, pigments, pigment dispersants, leveling agents, rheology control agents, ultraviolet absorbers, light stabilizers, plasticizers, and other coating composition additives generally used in the field of coating compositions. Accordingly, the clear coating composition (Z) may contain such coating composition additives.

Any pigment can be used without limitation. Examples thereof include coloring pigments, such as titanium oxide, zinc white, carbon black, cadmium red, molybdenum red, chrome yellow, chromium oxide, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; metallic pigments, such as aluminum powder, mica powder, and titanium oxide-coated mica powder; and the like.

These pigments can be used singly or in a combination of two or more. The pigment content, which varies depending on the type of pigment, is generally 0 to 200% by mass, and preferably about 1 to 100% by mass, based on the total solids content of the components (A), (B), and (C).

The coloring pigment content, which varies depending on the type of coloring pigment, is generally 0 to 150% by mass, and preferably about 1 to 100% by mass, based on the total solids content of the components (A), (B), and (C).

The pigment is preferably used in an amount that does not impair the transparency of the coating film obtained from the clear coating composition (Z).

A known ultraviolet absorber can be used. Examples thereof include benzotriazole absorbers, triazine absorbers, salicylic acid derivative absorbers, benzophenone absorbers, and other ultraviolet absorbers.

The content of the ultraviolet absorber in the clear coating composition (Z) is generally in the range of 0 to 10% by mass, preferably 0.2 to 5% by mass, and more preferably 0.3 to 2% by mass, based on the total resin solids content, from the viewpoint of weather resistance and yellowing resistance.

A known light stabilizer can be used. For example, a hindered amine light stabilizer can be used.

The content of the light stabilizer in the clear coating composition (Z) is generally in the range of 0 to 10% by mass, preferably 0.2 to 5% by mass, and more preferably 0.3 to 2% by mass, based on the total resin solids content, from the viewpoint of weather resistance and yellowing resistance.

From the viewpoint of storage stability, the clear coating composition (Z) is preferably in the form of a two-liquid-type coating composition in which the hydroxy-containing acrylic resin (A) and the organometallic catalyst (C) are separated from the polyisocyanate compound (B). It is preferable to mix both components immediately before use.

Method of Applying the Clear Coating Composition (Z)

The method of applying the clear coating composition (Z) is not particularly limited. For example, air spray coating, airless spray coating, rotary atomization coating, curtain coating, or other coating method can be used to form a wet coating film. In these coating methods, an electrostatic charge may be applied, if necessary. Of these methods, air spray coating is particularly preferred. The clear coating composition (Z) is generally applied to a cured film thickness of about 10 to 50 μm, and preferably about 20 to 40 μm.

When air spray coating, airless spray coating, or rotary atomization coating is performed, it is preferable to appropriately adjust, by using a solvent, such as an organic solvent, the viscosity of the clear coating composition (Z) in a viscosity range that is suitable for coating. The viscosity range is generally from about 15 to 60 seconds at 20° C. as measured by a Ford Cup #No. 4 viscometer.

An uncured coating film formed by applying the clear coating composition (Z) can be cured by heating at least one uncured base coating film, or by simultaneously heating at least one uncured base coating film and an uncured intermediate coating film, which is optionally formed.

Heating can be performed by known heating means. For example, a drying furnace, such as a hot air furnace, an electric furnace, or an infrared induction heating furnace, can be used. The heating retention temperature (keeping temperature) is preferably in the range of 60 to 120° C., more preferably 70 to 110° C., and even more preferably 80 to 100° C., in terms of excellent curability at low temperatures. The heating retention time (keeping time) is preferably in the range of 5 to 15 minutes, more preferably 5 to 12 minutes, and even more preferably 5 to 10 minutes, because the present method can achieve excellent short-time curability.

The present method, which makes it possible to obtain, with excellent curability at low temperatures and in a short time period, a multilayer coating film exhibiting an excellent finished appearance, can be suitably used as a method for forming multilayer coating films for general industrial products. In particular, the present method can be suitably used as a method for forming multilayer coating films for automobiles.

EXAMPLES

The present invention is described in more detail below with reference to Examples and Comparative Examples. However, the present invention is not limited to the following Examples. Also, in the following Examples, "part(s)" and "%" are based on mass, and the film thicknesses of coating films are based on the cured coating films.

Production of Hydroxy-Containing Acrylic Resin

Production Examples 1 to 12

In each Example, 31 parts of ethoxyethyl propionate was placed into a four-necked flask equipped with a stirrer, a thermometer, a condenser tube, and a nitrogen gas inlet, and heated to 155° C. under a nitrogen gas stream. After the temperature reached 155° C., the nitrogen gas stream was stopped, and a monomer mixture of the monomers and the polymerization initiator at the proportions shown in Table 1 below was added dropwise thereto over a period of 4 hours. Subsequently, aging was carried out at 155° C. for 2 hours under a nitrogen gas stream. The resulting product was then cooled to 100° C. and diluted with 32.5 parts (7.5 parts in only Production Example 10) of butyl acetate. Thereby, hydroxy-containing acrylic resins (A–1) to (A–12) having a solids content of 60% were obtained. Table 1 below shows the mass solids concentration (%) and resin properties of each of the obtained hydroxy-containing acrylic resins.

The glass transition temperature (° C.) values listed in Table 1 were calculated using the following formulae.

$$1/Tg\ (K) = (W1/T1) + (W2/T2) + \ldots$$

$$Tg(° C.) = Tg\ (K) - 273$$

In each formula, W1, W2, . . . represent the mass fractions of the monomers used for copolymerization, and T1, T2, . . . represent the Tg (K) of homopolymers of each of the monomers. The values shown in the column to the right side of each monomer name in Table 1 are the Tg (° C.) of the homopolymers of each of the monomers used for the above calculation.

The hydroxy-containing acrylic resins (A-11) and (A-12) are the resins used for the Comparative Examples.

TABLE 1

| | | | Production Example No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Hydroxy-containing Acrylic Resin (A–) | | | 1 | 2 | 3 | 4 | 5 | 6 | 7 | 8 | 9 | 10 | 11 | 12 |
| | | Tg° C. | | | | | | | | | | | | |
| a | 2-Hydroxypropyl Acrylate | −60 | 38 | 28 | 46.6 | 38 | 38 | | 38 | 32 | 38 | | 19 | 51 |
| | 2-Hydroxypropyl Methacrylate | 76 | | | | | | 42 | | | | | | |
| | 2-Hydroxyethyl Acrylate | −60 | | | | | | | | 5 | | 34 | | |
| b1 | Isobornyl Acrylate | 95 | 30 | 30 | 30 | 30 | 30 | 10 | | 30 | | 30 | 30 | 28 |
| | Cyclohexyl Methacrylate | 66 | | | | | | | 30 | | | | | |

TABLE 1-continued

| | | | Production Example No. | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| b (other than b1) | 2-Ethylhexyl Acrylate | −53 | 11 | 21 | 2.4 | 11 | 11 | 37 | 11 | 12 | 11 | 15 | 30 | |
| | N-Butyl Acrylate | −54 | | | | | | | | | 30 | | | |
| | Styrene | 100 | 20 | 20 | 20 | 20 | 20 | 10 | 20 | 20 | 20 | 20 | 20 | 20 |
| | Acrylic Acid | 106 | 1 | 1 | 1 | 1 | 1 | 1 | 1 | 1 | 1 | 1 | 1 | 1 |
| Di-t-amyl Peroxide (polymerization initiator) | | | 4 | 4 | 4 | 9 | 1 | 4 | 4 | 4 | 4 | 4 | 4 | 4 |
| Resin Properties | Mass Solids Concentration (%) | | 60 | 60 | 60 | 60 | 60 | 60 | 60 | 60 | 60 | 60 | 60 | 60 |
| | Weight Average Molecular Weight | | 13000 | 13000 | 13000 | 5000 | 30000 | 13000 | 13000 | 13000 | 13000 | 13000 | 13000 | 13000 |
| | Hydroxy Value (mg KOH/g) | | 164 | 120 | 201 | 164 | 164 | 163 | 164 | 162 | 164 | 164 | 82 | 220 |
| | Glass Transition Temperature (° C.) | | 0 | 1 | −1 | 0 | 0 | 17 | −5 | −5 | −36 | 1 | −3 | −4 |

Production of Organometallic Catalyst

Production Example 13

47 parts of ethyl-3-ethoxypropionate and 81.6 parts of Nikka Octhix Zinc (*1) (zinc octylate, produced by Nihon Kagaku Sangyo Co., Ltd., zinc content: 8% by mass) were placed into a reactor equipped with a stirrer, a condenser, a temperature controller, a nitrogen inlet tube, and a dropping funnel. The air in the reactor was replaced with nitrogen, and the mixture was heated to 50° C. Subsequently, 16.4 parts of 1-methylimidazole was added dropwise thereto while being stirred. After completion of the dropwise addition, the 50° C. temperature was maintained for 2 hours, and the reaction was terminated. The obtained organometallic catalyst (C-1) was a transparent liquid having a zinc content of 4.5% by mass.

Production Examples 14 to 29

Organometallic catalysts (C-2) to (C-17) having the compositions shown in Table 2 below were obtained in the same manner as in Production Example 13.

Table 2 below also shows the molar ratio of amidine compound (C2) to metallic compound (C1) and the metal concentration by mass (%) of each of the organometallic catalysts (C-1) to (C-17).

The organometallic catalyst (C-17) is a catalyst used for a Comparative Example.

The notes (*1) to (*12) in Table 2 are as follows.

Nikka Octhix Zinc (*1): trade name, zinc octylate, zinc content: 8%, produced by Nihon Kagaku Sangyo Co., Ltd.
Nikka Octhix Tin (*2): trade name, tin octylate, tin content: 28%, produced by Nihon Kagaku Sangyo Co., Ltd.
Nikka Octhix Lead (*3): trade name, lead octylate, lead content: 24%, produced by Nihon Kagaku Sangyo Co., Ltd.
K-KAT 348 (*4): trade name, bismuth octylate, bismuth content: 25%, produced by King Industries Inc.
Nikka Octhix Cobalt (*5): trade name, cobalt octylate, cobalt content: 8%, produced by Nihon Kagaku Sangyo Co., Ltd.
Nikka Octhix Manganese (*6): trade name, manganese octylate, manganese content: 8%, produced by Nihon Kagaku Sangyo Co., Ltd.
Zinc Naphthenate (*7): zinc content: 10.1%, produced by Tokyo Chemical Industry Co., Ltd.
Zinc Acetylacetonate (*8): zinc content: 25%, produced by Showa Chemical Co., Ltd.
Zinc Dibenzoate (*9): zinc content: 21.3%, produced by Wako Pure Chemical Industries, Ltd.
Zinc Laurate (*10): zinc content: 14.1%, produced by Wako Pure Chemical Industries, Ltd.
DBN (*11): 1,5-diazabicyclo[4.3.0]non-5-ene
DBU (*12): 1,8-diazabicyclo[5.4.0]undec-7-ene

TABLE 2

| | | Production Example No. | | | | | | | | | | | | | | | |
|---|---|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 26 | 27 | 28 | 29 |
| Organometallic Catalyst (C-) | | 1 | 2 | 3 | 4 | 5 | 6 | 7 | 8 | 9 | 10 | 11 | 12 | 13 | 14 | 15 | 16 | 17 |
| C1 | Nikka Octhix Zinc (*1) | 81.6 | | | | | | | | | | 81.6 | 81.6 | 81.6 | 81.6 | 81.6 | 81.6 | 81.6 |
| | Nikka Octhix Tin (*2) | | 41.6 | | | | | | | | | | | | | | | |
| | Nikka Octhix Lead (*3) | | | 86.3 | | | | | | | | | | | | | | |
| | K-KAT 348 (*4) | | | | 83.6 | | | | | | | | | | | | | |
| | Nikka Octhix Cobalt (*5) | | | | | 68.5 | | | | | | | | | | | | |
| | Nikka Octhix Manganese (*6) | | | | | | 69 | | | | | | | | | | | |
| | Zinc Naphthenate (*7) | | | | | | | 64.7 | | | | | | | | | | |
| | Zinc Acetylacetonate (*8) | | | | | | | | 26.2 | | | | | | | | | |
| | Zinc Dibenzoate (*9) | | | | | | | | | 30.7 | | | | | | | | |
| | Zinc Laurate (*10) | | | | | | | | | | 46.4 | | | | | | | |

TABLE 2-continued

| | | Production Example No. | | | | | | | | | | | | | | | | |
|---|---|---|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 26 | 27 | 28 | 29 |
| C2 | 1-Methylimidazole | 16.4 | 16.4 | 16.4 | 16.4 | 16.4 | 16.4 | 16.4 | 16.4 | 16.4 | 16.4 | | | | | 32.8 | 14.8 | |
| | 1-Butylimidazole | | | | | | | | | | | 24.8 | | | | | | |
| | DBN (*11) | | | | | | | | | | | | 24.8 | | | | | |
| | DBU (*12) | | | | | | | | | | | | | 30.4 | | | | |
| | Tetramethylguanidine | | | | | | | | | | | | | | 23 | | | |
| | Ethyl-3-ethoxypropionate | 47 | 205 | 358 | 364 | 46 | 36.6 | 64 | 102 | 98.2 | 82.6 | 39 | 39 | 33 | 41 | 31 | 49 | 63 |
| | Molar Ratio of C2 to C1 | 2 | 2 | 2 | 2 | 2 | 2 | 2 | 2 | 2 | 2 | 2 | 2 | 2 | 2 | 4 | 1.8 | |
| | Metal Concentration by Mass (%) | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |

Production of Acrylic Resin for Base Coating Composition (Y)

Production Example 30

130 parts of deionized water and 0.52 parts of "Aqualon KH-10" (produced by Dai-ichi Kogyo Seiyaku Co., Ltd., trade name, a polyoxyethylene alkyl ether sulfate ester ammonium salt, active ingredient: 97%) were placed into a reactor equipped with a thermometer, a thermostat, a stirrer, a reflux condenser, a nitrogen inlet tube, and a dropping funnel. The mixture was stirred under a nitrogen gas stream, and heated to 80° C. Subsequently, 1% of the entire mass of the below-described Monomer Emulsion 1 and 5.3 parts of a 6% ammonium persulfate aqueous solution were introduced into the reactor, and the reactor was maintained at 80° C. for 15 minutes. The remaining Monomer Emulsion 1 was then added dropwise into the reactor over a period of 3 hours while maintaining the reactor at the same temperature. After completion of the dropwise addition, the mixture was aged for 1 hour. Subsequently, the below-described Monomer Emulsion 2 was added dropwise thereto over a period of 1 hour. After aging for 1 hour, the resulting mixture was cooled to 30° C. while 40 parts of a 5% 2-(dimethylamino)ethanol aqueous solution was being gradually added thereto, followed by filtering through a 100-mesh nylon cloth, thereby giving as filtrate a hydroxy-containing acrylic resin dispersion having a solids content of 30% and a mean particle diameter of 100 nm, which was measured at 20° C. with a COULTER N4 submicron particle size distribution analyzer (produced by Beckman Coulter) after diluting the dispersion with deionized water. The obtained hydroxy-containing acrylic resin had an acid value of 33 mg KOH/g and a hydroxy value of 25 mg KOH/g.

Monomer Emulsion 1

42 parts of deionized water, 0.72 parts of Aqualon KH-10, 2.1 parts of methylene bisacrylamide, 2.8 parts of styrene, 16.1 parts of methyl methacrylate, 28 parts of ethyl acrylate, and 21 parts of n-butyl acrylate were mixed while being stirred, thereby giving Monomer Emulsion 1.

Monomer Emulsion 2

18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate, and 9 parts of n-butyl acrylate were mixed while being stirred, thereby giving Monomer Emulsion 2.

Production of Polyester Resin for Base Coating Composition (Y)

Production Example 31

109 parts of trimethylolpropane, 141 parts of 1,6-hexanediol, 126 parts of hexahydrophthalic anhydride, and 120 parts of adipic acid were placed into a reactor equipped with a thermometer, a thermostat, a stirrer, a reflux condenser, and a water separator. After the temperature was raised from 160 to 230° C. over a period of 3 hours, the mixture was subjected to a condensation reaction at 230° C. for 4 hours. Next, in order to add carboxyl groups to the resulting condensation reaction product, 38.3 parts of trimellitic anhydride was added, and the mixture was then allowed to react at 170° C. for 30 minutes. The reaction mixture was then diluted with 2-ethyl-1-hexanol, thereby giving a polyester resin solution having a solids content of 70%. The obtained polyester resin had an acid value of 46 mg KOH/g, a hydroxy value of 150 mg KOH/g, and a weight average molecular weight of 6,400.

Production Example of Luster Pigment Dispersion

Production Example 32

19 parts of an aluminum pigment paste (trade name "GX-180A" produced by Asahi Kasei Metals Ltd., metal content: 74%), 35 parts of 2-ethyl-1-hexanol, 8 parts of a phosphoric acid group-containing resin solution (Note 1), and 0.2 parts of 2-(dimethylamino)ethanol were homogeneously mixed in a vessel for stirring and mixing, thereby giving Luster Pigment Dispersion 1.

Note 1: Phosphoric Acid Group-Containing Resin Solution

A solvent mixture comprising 27.5 parts of methoxypropanol and 27.5 parts of isobutanol was placed into a reactor equipped with a thermometer, a thermostat, a stirrer, a reflux condenser, a nitrogen inlet tube and a dropping funnel, and then heated to 110° C. Subsequently, 121.5 parts of a mixture comprising 25 parts of styrene, 27.5 parts of n-butyl methacrylate, 20 parts of a branched higher alkyl acrylate (trade name "isostearyl acrylate" produced by Osaka Organic Chemical Industry Ltd.), 7.5 parts of 4-hydroxybutyl acrylate, 15 parts of a phosphoric acid group-containing polymerizable monomer (Note 2), 12.5 parts of 2-methacryloyloxy ethyl acid phosphate, 10 parts of isobutanol and 4 parts of t-butyl peroxyoctanoate were added to the above solvent mixture over a period of 4 hours. Subsequently, a mixture comprising 0.5 parts of t-butyl peroxyoctanoate and 20 parts of isopropanol was added dropwise to the solvent mixture over a period of 1 hour. The resulting mixture was aged for 1 hour while being stirred, thereby giving a phosphoric acid group-containing resin solution with a solids content of 50%. The phosphoric acid group-containing resin had an acid value of 83 mg KOH/g based on the phosphoric acid group, a hydroxy value of 29 mg KOH/g, and a weight average molecular weight of 10,000.

Note 2: Phosphoric Acid Group-Containing Polymerizable Monomer 57.5 parts of monobutyl phosphate and 41 parts of isobutanol were placed into a reactor equipped with a thermometer, a thermostat, a stirrer, a reflux condenser, a nitrogen inlet tube and a dropping funnel, and heated to 90° C. Subsequently, 42.5 parts of glycidyl methacrylate was added dropwise thereto over a period of 2 hours. After aging for 1 hour while being stirred, 59 parts of isopropanol was added to the resulting mixture, thereby giving a phosphoric acid group-containing polymerizable monomer solution with a solids content of 50%. The obtained monomer had an acid value of 285 mg KOH/g based on the phosphoric acid group.

Production Example 33

The procedure of Production Example 32 was repeated except that 5 parts of an aluminum pigment paste was used in place of 19 parts thereof, thereby giving Luster Pigment Dispersion 2.

Production of Base Coating Composition (Y)

Production Example 34

100 parts of the hydroxy-containing acrylic resin dispersion (solids content: 30 parts) obtained in Production Example 30, 57 parts of the polyester resin solution (solids content: 40 parts) obtained in Production Example 31, 62 parts of Luster Pigment Dispersion 1 (resin solids content: 4 parts) obtained in Production Example 32, and 37.5 parts of a melamine resin (trade name "Cymel 325," produced by Japan Cytec Industries, Inc., solids content: 80%) (solids content: 30 parts) were homogeneously mixed, and a polyacrylic acid thickening agent (trade name "Primal ASE-60," produced by Rohm and Haas), 2-(dimethylamino)ethanol, and deionized water were further added thereto, thereby giving a base coating composition (Y-1) having a pH of 8.0, a coating composition solids content of 25%, and a viscosity of 40 seconds as measured at 20° C. using Ford Cup No. 4.

Production Example 35

The procedure of Production Example 34 was repeated except that 48 parts (resin solids content: 4 parts) of Luster Pigment Dispersion 1 obtained in Production Example 33 was used in place of 62 parts (resin solids content: 4 parts) of Luster Pigment Dispersion 1 obtained in Production Example 32, thereby giving a base coating composition (Y-2) having a pH of 8.0, a coating composition solids content of 25%, and a viscosity of 40 seconds as measured at 20° C. using a Ford Cup No. 4.

Production of Resin for Pigment Dispersion

Production Example 36

30 parts of propylene glycol monopropyl ether was placed into a reactor equipped with a thermometer, a thermostat, a stirrer, a reflux condenser, a nitrogen inlet tube, and a dropping funnel, and heated to 85° C. Subsequently, a mixture comprising 10 parts of styrene, 30 parts of methyl methacrylate, 15 parts of 2-ethylhexyl acrylate, 11.5 parts of n-butyl acrylate, 30 parts of hydroxyethyl acrylate, 3.5 parts of acrylic acid, 10 parts of propylene glycol monopropyl ether, and 2 parts of 2,2'-azobis(2,4-dimethylvaleronitrile) was added dropwise thereto over a period of 4 hours. After completion of the dropwise addition, the mixture was aged for 1 hour. Subsequently, a mixture comprising 5 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour. To the resulting mixture, 3.03 parts of 2-(dimethylamino)ethanol was further added, and then deionized water was gradually added dropwise, thereby giving a hydroxy-containing acrylic resin solution (resin solution for pigment dispersion) having a solids content of 40%. The obtained hydroxy-containing acrylic resin had an acid value of 27 mg KOH/g, and a hydroxy value of 145 mg KOH/g.

Production of Intercoating Composition (X)

Production Example 37

25.5 parts of the resin solution for pigment dispersion (resin solids content: 10.2 parts) obtained in Production Example 36, 87 parts of rutile titanium dioxide, 0.8 parts of carbon black, and 43 parts of deionized water were mixed. The mixture was adjusted to a pH of 8.0 using 2-(dimethylamino)ethanol, followed by dispersion using a paint shaker for 30 minutes, thereby giving a pigment dispersion paste.

Subsequently, 156 parts of the obtained pigment dispersion paste, 116.7 parts of the hydroxy-containing acrylic resin dispersion obtained in Production Example 30, 125 parts of "UX-5200" (produced by Sanyo Chemical Industries, Ltd., a urethane resin emulsion, solids content: 40%), and 21.4 parts of melamine resin (methyl etherified melamine resin, weight average molecular weight: 800, solids content: 70%) were homogeneously mixed.

Subsequently, "ASE-60," (produced by Rohm and Haas Company, trade name, an alkali soluble anionic thickener), 2-(dimethylamino)ethanol, and deionized water were added to the resulting mixture, thereby giving an intercoating composition (X-1) having a pH of 8.2, a coating composition solids content of 44%, and a viscosity of 30 seconds as measured at 20° C. using a Ford Cup No. 4.

Production of Coating Composition

Examples 1 to 3, 7 to 37, and Comparative Examples 1 to 6

According to the proportions of the coating composition components shown in Table 3 below, the hydroxy-containing acrylic resins obtained in the above Production Examples 1 to 12, the organometallic catalysts obtained in the above Production Examples 13 to 29, and the other components shown in Table 3 were made into coating compositions by mixing them while being stirred by a blade stirrer, thereby giving Coating Compositions No. 1 to 40. The proportions of the coating composition components shown in Table 3 are indicated by mass parts on a solids basis for each component.

The polyisocyanate compounds (B-1) to (B-8) in Table 3 refer to the following.

Polyisocyanate compound (B-1): a polyisocyanate compound derived from hexamethylene diisocyanate, composition ratio of multimers: isocyanurate trimer (53%) and other trimers or higher multimers (47%), solids content: 100%, NCO content: 21.8%, viscosity at 25° C.: 3000 mPa·s.

Polyisocyanate compound (B-2): a polyisocyanate compound derived from hexamethylene diisocyanate, composition ratio of multimers: isocyanurate trimer (63%), urethodione dimer (12%), and other trimers or higher multimers (25%), solids content: 100%, NCO content: 21.8%, viscosity at 25° C.: 500 mPa·s.

Polyisocyanate compound (B-3): a polyisocyanate compound derived from hexamethylene diisocyanate, composition ratio of multimers: isocyanurate trimer (45%), urethodione dimer (25%), and other trimers or higher multimers (30%), solids content: 100%, NCO content: 21.8%, viscosity at 25° C.: 340 mPa·s.

Polyisocyanate compound (B-4): a polyisocyanate compound derived from hexamethylene diisocyanate; composition ratio of multimers: isocyanurate trimer (27%), urethodione dimer (37%), and other trimers or higher multimers (36%); solids content: 100%; NCO content: 21.8%; viscosity at 25° C.: 180 mPa·s.

Polyisocyanate compound (B-5): N3200, trade name, produced by Bayer, biuret of hexamethylene diisocyanate, solids content: 100%, NCO content: 23.0%, viscosity at 25° C.: 2500 mPa·s.

Polyisocyanate compound (B-6): XP2580, trade name, produced by Bayer, allophanate of hexamethylene diisocyanate, solids content: 100%, NCO content: 19.5%, viscosity at 25° C.: 450 mPa·s.

Polyisocyanate compound (B-7): Z4470, trade name, produced by Bayer, isocyanurate of isophorone diisocyanate, solids content: 70%, NCO content: 11.9%, viscosity at 25° C.: 600 mPa·s.

Polyisocyanate Compound (B-8): N3800, trade name, produced by Bayer, isocyanurate of hexamethylene diisocyanate, solids content: 100%, NCO content: 11.0%, and viscosity at 25° C.: 6,000 mPa·s.

By adding butyl acetate, Coating Compositions Nos. 1 to 40 obtained in Examples 1 to 3 and 7 to 37 and Comparative Examples 1 to 6 were adjusted to have a viscosity of 25 seconds at 20° C. using Ford Cup #No. 4.

The following tests were performed for the obtained coating compositions and individual test plates obtained by applying each coating composition.

NCO conversion: Using an FT-IR device, "FT/IR-420" (produced by JASCO Corporation), the NCO conversion was evaluated by a liquid membrane method immediately after mixing the components of each coating composition and adjusting the viscosity, and by measuring the surface of each test plate by the ATR method after heat-curing (at 100° C. for 7 minutes). The NCO conversion was determined by calculating the isocyanate peak (1690 cm$^{-1}$) intensity and isocyanurate peak (2271 cm$^{-1}$) intensity and calculating the ratio of these intensities.

NCO conversion (%)=100−NCO residual ratio (%)

NCO residual ratio (%)=(isocyanate peak intensity after heat-curing/isocyanurate peak intensity after heat-curing)/(isocyanate peak intensity immediately after mixing components of coating composition/isocyanurate peak intensity immediately after mixing components of coating composition)×100

Usable time (pot life): As described above, the viscosity at 20° C. of each of the produced and viscosity-adjusted coating compositions was measured initially, after 4 hours, and after 6 hours, using Ford Cup #No. 4. The term "gel" in Table 3 below means that gelling occurred.

Preparation of Test Plates

Examples 1 to 3 and 7 to 37, and Comparative Examples 1 to 6

"Elecron GT-10" (produced By Kansai Paint Co., Ltd., trade name, a thermosetting epoxy resin-based cationic electrodeposition coating composition) was applied by electrodeposition to 0.8-mm thick dull steel plates treated by chemical conversion with zinc phosphate so as to have a film thickness of 20 μm, and the resulting films were cured by heating at 170° C. for 30 minutes. Subsequently, the base coating composition (Y-1) obtained in Production Example 34 was electrostatically applied to the cured coating films with a rotary electrostatic spray coater to have a cured film thickness of 20 μm, and allowed to stand for 3 minutes, followed by preheating at 80° C. for 3 minutes.

Subsequently, Coating Compositions Nos. 1 to 40 produced and viscosity-adjusted in the above Examples and Comparative Examples were electrostatically applied to the uncured base coating films individually to have a film thickness of 35 μm, and allowed to stand at room temperature for 7 minutes, followed by heating at 100° C. for 7 minutes (the time during which the coated plates were maintained at 100° C.). The resulting multilayer coating films each comprising a base coating film and a clear coating film were cured, thereby giving test plates.

Preparation of Test Plate

Example 4

ELECRON GT-10 (produced by Kansai Paint Co., Ltd., trade name, a thermosetting epoxy resin-based cationic electrodeposition coating composition) was applied by electrodeposition to a 0.8-mm thick dull steel plate treated by chemical conversion with zinc phosphate so as to have a film thickness of 20 μm, and the resulting film was cured by heating at 170° C. for 30 minutes. Subsequently, the base coating composition (Y-1) obtained in Production Example 34 was electrostatically applied to the cured coating film with a rotary electrostatic spray coater to have a cured film thickness of 15 μm, and allowed to stand for 3 minutes, followed by preheating at 80° C. for 3 minutes.

Subsequently, the base coating composition (Y-2) obtained in Production Example 35 was electrostatically applied to the uncured base coating film with a rotary electrostatic spray coater to have a cured film thickness of 10 μm, and allowed to stand for 5 minutes, followed by preheating at 80° C. for 3 minutes.

Subsequently, Coating Composition No. 1 produced and viscosity-adjusted in the above Example was electrostatically applied to the uncured base coating film to have a film thickness of 35 μm, and allowed to stand at room temperature for 7 minutes, followed by heating at 100° C. for 7 minutes (the time during which the coated plate was maintained at 100° C.). The resulting multilayer coating film comprising two base coating films and a clear coating film was cured, thereby giving a test plate.

Preparation of Test Plates

Examples 5 and 6

ELECRON GT-10 A (produced by Kansai Paint Co., Ltd., trade name, a thermosetting epoxy resin-based cationic electrodeposition coating composition) was applied by electrodeposition to 0.8-mm thick dull steel plates treated by chemical conversion with zinc phosphate so as to have a film thickness of 20 μm, and the resulting films were cured by heating at 170° C. for 30 minutes. Subsequently, the intercoating composition (X-1) obtained in Production Example 37 was electrostatically applied to the cured coating films with a rotary electrostatic spray coater to have a cured film thickness of 20 μm, and allowed to stand for 3 minutes, followed by preheating at 80° C. for 3 minutes.

Subsequently, the base coating composition (Y-1) obtained in Production Example 34 was electrostatically applied to the uncured intercoating films with a rotary electrostatic spray coater to have a cured film thickness of 15 μm, and allowed to stand for 5 minutes, followed by preheating at 80° C. for 3 minutes.

Subsequently, the coating compositions produced and viscosity-adjusted in the above Examples (No. 1 was used for Example 5, and No. 2 was used for Example 6) were electrostatically applied to the uncured base coating films to have a film thickness of 35 μm, and allowed to stand at room temperature for 7 minutes, followed by heating at 100° C. for 7 minutes (the time during which the coated plates were maintained at 100° C.). The resulting multilayer coating films each comprising an intercoating film, a base coating film, and a clear coating film were cured, thereby giving test plates.

Knoop hardness: After each test plate was allowed to stand in a thermostatic room at 20° C. for 24 hours, the "Tukon hardness" was measured using a Tukon tester (produced By American Chain & Cable Company, micro hardness tester).

Tukon hardness, also called the "Knoop Hardness Number (KHN)," is a value expressing the hardness of a coating film, and is determined by pressing a square pyramidal diamond indenter with a specific load into the surface of a test material, and measuring the size of the diamond-shaped indentation in the surface. The higher the Tukon hardness value, the greater the hardness. The Knoop hardness is preferably 7 or more.

Finished appearance: A brightness/darkness pattern of light on the surface of the coating film of each test plate was optically scanned to determine the longterm waviness measured in the wavelength region of 600 to 1000 μm and shortterm waviness measured in the wavelength region of 100 to 600 μm by using a "Wave-Scan" produced by BYK, which is a device for analyzing the contrast (intensity) of reflected light. The longterm waviness and shortterm waviness were evaluated as parameters for finished texture. They are variances of measured light intensity. The smaller the variances, the better the finished texture (smoothness of the coated surface).

Table 3 below shows the test results and the proportions of the coating composition components.

TABLE 3

| | | Example |||||||||||||||
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| | | Coating Composition No. |||||||||||||||
| | | 1 | 2 | 3 | 1 | 1 | 2 | 4 | 5 | 6 | 7 | 8 | 9 | 10 | 11 | 12 |
| Hydroxy-Containing Acrylic Resin (A) | Resin Name (A-) Amount (Parts) | 1<br>60 | 1<br>54 | 1<br>64 | 1<br>60 | 1<br>60 | 1<br>54 | 1<br>60 | 2<br>67 | 3<br>55 | 4<br>60 | 5<br>60 | 6<br>60 | 7<br>60 | 8<br>60 | 9<br>60 |
| Polyisocyanate Compound (B) | B-1<br>B-2<br>B-3<br>B-4<br>B-5<br>B-6<br>B-7<br>B-8 | 40 | 46 | 36 | 40 | 40 | 46 | 40 | 33 | 45 | 40 | 40 | 40 | 40 | 40 | 40 |
| | NCO/OH Ratio | 1.2 | 1.5 | 1.0 | 1.2 | 1.2 | 1.5 | 1.2 | 1.2 | 1.2 | 1.2 | 1.2 | 1.2 | 1.2 | 1.2 | 1.2 |
| Organometallic Catalyst (C) | Catalyst Name (C-) Amount (Parts) | 1<br>1.0 | 1<br>1.0 | 1<br>1.0 | 1<br>1.0 | 1<br>1.0 | 1<br>1.0 | 1<br>0.5 | 1<br>1.0 | 1<br>1.0 | 1<br>1.0 | 1<br>1.0 | 1<br>1.0 | 1<br>1.0 | 1<br>1.0 | 1<br>1.0 |
| | NCO Conversion (%) | 89 | 85 | 91 | 88 | 90 | 85 | 84 | 93 | 87 | 93 | 87 | 86 | 89 | 95 | 91 |
| Usable Time Pot Life seconds | Initial<br>After 4 Hours<br>After 6 Hours | 25<br>29<br>33 | 25<br>30<br>35 | 25<br>28<br>31 | 25<br>29<br>33 | 25<br>29<br>33 | 25<br>30<br>35 | 25<br>27<br>28 | 25<br>27<br>28 | 25<br>29<br>34 | 25<br>28<br>31 | 25<br>30<br>34 | 25<br>30<br>35 | 25<br>29<br>34 | 25<br>29<br>36 | 25<br>28<br>31 |
| | Knoop Hardness | 12 | 11 | 10 | 9 | 10 | 11 | 10 | 8 | 13 | 10 | 13 | 14 | 12 | 13 | 9 |
| Finished Appearance | Longterm Waviness<br>Shortterm Waviness | 3<br>13 | 3<br>14 | 2<br>12 | 4<br>16 | 4<br>14 | 4<br>15 | 2<br>11 | 2<br>12 | 4<br>15 | 2<br>12 | 4<br>16 | 4<br>15 | 2<br>12 | 3<br>14 | 2<br>12 |

| | | Example ||||||||||||||
|---|---|---|---|---|---|---|---|---|---|---|---|---|---|---|---|
| | | 16 | 17 | 18 | 19 | 20 | 21 | 22 | 23 | 24 | 25 | 26 | 27 | 28 | 29 | 30 |
| | | Coating Composition No. ||||||||||||||
| | | 13 | 14 | 15 | 16 | 17 | 18 | 19 | 20 | 21 | 22 | 23 | 24 | 25 | 26 | 27 |
| Hydroxy-Containing Acrylic Resin (A) | Resin Name (A-) Amount (Parts) | 10<br>60 | 1<br>60 | 1<br>60 | 1<br>60 | 1<br>60 | 1<br>60 | 1<br>60 | 1<br>60 | 1<br>60 | 1<br>60 | 1<br>60 | 1<br>60 | 1<br>60 | 1<br>60 | 1<br>60 |
| Polyisocyanate Compound (B) | B-1<br>B-2<br>B-3<br>B-4<br>B-5<br>B-6<br>B-7<br>B-8 | 40 | 40 | 40 | 40 | 40 | 40 | 40 | 40 | 40 | 40 | 40 | 40 | 40 | 40 | 40 |
| | NCO/OH Ratio | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |

TABLE 3-continued

| Organometallic Catalyst (C) | Catalyst Name (C-) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | Amount (Parts) | 0.5 | 0.5 | 0.5 | 0.5 | 1.0 | 1.0 | 1.0 | 1.0 | 1.0 | 1.0 | 1.0 | 1.0 | 1.0 | 1.0 | 1.0 |
| | NCO Conversion (%) | 97 | 96 | 93 | 92 | 90 | 90 | 92 | 89 | 84 | 85 | 89 | 90 | 89 | 89 | 85 |
| Usable Time | Initial | 25 | 25 | 25 | 25 | 25 | 25 | 25 | 25 | 25 | 25 | 25 | 25 | 25 | 25 | 25 |
| Pot Life | After 4 Hours | 31 | 30 | 30 | 30 | 30 | 31 | 29 | 27 | 27 | 28 | 30 | 30 | 30 | 30 | 28 |
| seconds | After 6 Hours | 37 | 36 | 36 | 38 | 36 | 34 | 32 | 31 | 29 | 30 | 36 | 35 | 37 | 33 | 30 |
| | Knoop Hardness | 14 | 13 | 13 | 13 | 12 | 11 | 12 | 10 | 10 | 10 | 12 | 13 | 12 | 11 | 10 |
| Finished Appearance | Longterm Waviness | 4 | 4 | 4 | 4 | 3 | 2 | 3 | 2 | 2 | 2 | 3 | 4 | 4 | 3 | 1 |
| | Shortterm Waviness | 16 | 14 | 14 | 14 | 13 | 12 | 14 | 12 | 11 | 12 | 13 | 15 | 15 | 13 | 11 |

| | | Example | | | | | | | Comparative Example | | | | | |
|---|---|---|---|---|---|---|---|---|---|---|---|---|---|---|
| | | 31 | 32 | 33 | 34 | 35 | 36 | 37 | 1 | 2 | 3 | 4 | 5 | 6 |
| | | | | | | | | Coating Composition No. | | | | | | |
| | | 28 | 29 | 30 | 31 | 32 | 33 | 34 | 35 | 36 | 37 | 38 | 39 | 40 |
| Hydroxy-Containing Acrylic Resin (A) | Resin Name (A-) | 1 | 1 | 1 | 1 | 1 | 1 | 1 | 11 | 12 | 1 | 1 | 1 | 1 |
| | Amount (Parts) | 60 | 60 | 60 | 60 | 59 | 59 | 60 | 75 | 52 | 60 | 57 | 72 | 54 |
| Polyisocyanate Compound (B) | B-1 | 40 | | | | | 33 | 20 | 25 | 48 | | 28 | | 46 |
| | B-2 | | 40 | | | | | | | | | | | |
| | B-3 | | | 40 | | | | | | | | | | |
| | B-4 | | | | | | 20 | | | | 40 | | | |
| | B-5 | | | | 40 | | | | | | | | | |
| | B-6 | | | | | 41 | | | | | | | | |
| | B-7 | | | | | | 8.2 | | | | | | | |
| | B-8 | | | | | | | | | | | 43 | | |
| | NCO/OH Ratio | 1.2 | 1.2 | 1.2 | 1.2 | 1.2 | 1.2 | 1.2 | 1.2 | 1.2 | 1.2 | 1.2 | 0.7 | 1.2 |
| Organometallic Catalyst (C) | Catalyst Name (C-) | 16 | 1 | 1 | 1 | 1 | 1 | 1 | 1 | 1 | 1 | 1 | 1 | 17 |
| | Amount (Parts) | 1.0 | 1.0 | 1.0 | 1.0 | 1.0 | 1.0 | 1.0 | 1.0 | 1.0 | 1.0 | 1.0 | 1.0 | 1.0 |
| | NCO Conversion (%) | 91 | 93 | 95 | 86 | 91 | 87 | 94 | 94 | 83 | 95 | 95 | 96 | 93 |
| Usable Time | Initial | 25 | 25 | 25 | 25 | 25 | 25 | 25 | 25 | 25 | 25 | 25 | 25 | 25 |
| Pot Life | After 4 Hours | 30 | 27 | 28 | 27 | 27 | 28 | 30 | 28 | 50 | 31 | 29 | 28 | gel |
| seconds | After 6 Hours | 38 | 31 | 31 | 32 | 31 | 33 | 33 | 30 | gel | 34 | 33 | 31 | gel |
| | Knoop Hardness | 13 | 13 | 12 | 12 | 11 | 14 | 11 | 4 | 14 | 5 | 6 | 5 | 12 |
| Finished Appearance | Longterm Waviness | 4 | 3 | 3 | 3 | 3 | 3 | 4 | 2 | 4 | 1 | 3 | 1 | 4 |
| | Shortterm Waviness | 16 | 13 | 14 | 13 | 12 | 14 | 15 | 12 | 29 | 11 | 14 | 11 | 27 |

The invention claimed is:

1. A method for forming a multilayer coating film comprising:
    applying one or more base coating compositions (Y) in at least one layer to a substrate to form a base coating film in at least one layer;
    applying one or more clear coating compositions (Z) to the above uncured base coating film formed in at least one layer; and
    simultaneously curing the at least one layer of uncured base coating film and the above uncured clear coating film,
    wherein the one or more clear coating compositions (Z) comprises:
    a hydroxy-containing acrylic resin (A) having a hydroxy value in the range of 85 to 215 mg KOH/g,
    a polyisocyanate compound (B) having a viscosity at 25° C. in the range of 200 to 4,000 mPa·s,
    an organometallic catalyst (C) containing a metallic compound (C1) in which the metal is a member selected from the group consisting of zinc, tin, zirconium, bismuth, lead, cobalt, manganese, titanium, aluminum and molybdenum, and an amidine compound (C2), and an organic solvent,
    wherein the equivalent ratio (NCO/OH) of isocyanate groups in the polyisocyanate compound (B) to hydroxy groups in the hydroxy-containing acrylic resin (A) is in the range of 0.8 to 1.8.

2. The method for forming a multilayer coating film according to claim 1, wherein the content of secondary hydroxy-containing polymerizable unsaturated monomer (a1) relative to the total mass of hydroxy-containing polymerizable unsaturated monomer (a) in the hydroxy-containing acrylic resin (A) is 50 to 100% by mass.

3. The method for forming a multilayer coating film according to claim 1, wherein the hydroxy-containing acrylic resin (A) comprises, as at least one other polymerizable unsaturated monomer (b), a $C_{6-20}$ alicyclic hydrocarbon-containing polymerizable unsaturated monomer (b1).

4. The method for forming a multilayer coating film according to claim 1, wherein the hydroxy-containing acrylic resin (A) has a weight average molecular weight in the range of 2,000 to 50,000.

5. The method for forming a multilayer coating film according to claim 1, wherein the metallic compound (C1) is a carboxylic acid metal salt compound.

6. The method for forming a multilayer coating film according to claim 1, wherein the content of the organometallic catalyst (C) is in the range of 0.05 to 5% by mass relative to the total mass of the hydroxy-containing acrylic resin (A) and the polyisocyanate compound (B).

7. An article containing a multilayer coating film formed by the method for forming a multilayer coating film according to claim 1.

8. An article containing a multilayer coating film formed by the method for forming a multilayer coating film according to claim 2.

9. An article containing a multilayer coating film formed by the method for forming a multilayer coating film according to claim 3.

10. An article containing a multilayer coating film formed by the method for forming a multilayer coating film according to claim 4.

11. An article containing a multilayer coating film formed by the method for forming a multilayer coating film according to claim 5.

12. An article containing a multilayer coating film formed by the method for forming a multilayer coating film according to claim 6.

* * * * *